United States Patent
Tabata et al.

(10) Patent No.: US 8,740,747 B2
(45) Date of Patent: Jun. 3, 2014

(54) CONTROL DEVICE FOR VEHICLE DRIVE DEVICE

(75) Inventors: Atsushi Tabata, Okazaki (JP); Tooru Matsubara, Toyota (JP); Masakazu Kaifuku, Okazaki (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 253 days.

(21) Appl. No.: 13/263,808

(22) PCT Filed: Apr. 10, 2009

(86) PCT No.: PCT/JP2009/057404
§ 371 (c)(1),
(2), (4) Date: Dec. 19, 2011

(87) PCT Pub. No.: WO2010/116534
PCT Pub. Date: Oct. 14, 2010

(65) Prior Publication Data
US 2012/0108384 A1    May 3, 2012

(51) Int. Cl.
*B60W 10/04*    (2006.01)

(52) U.S. Cl.
USPC .............................................. 477/111; 477/3

(58) Field of Classification Search
None
See application file for complete search history.

(56) References Cited

U.S. PATENT DOCUMENTS 7,291,092 B2 *  11/2007  Tohta et al. ................ 477/98

FOREIGN PATENT DOCUMENTS

| DE | 10 2008 002 011 A1 | 12/2008 |
|---|---|---|
| JP | 63 270959 | 11/1988 |
| JP | 2 204138 | 8/1990 |
| JP | 2004 316831 | 11/2004 |
| JP | 2007 10092 | 1/2007 |
| JP | 2007 91193 | 4/2007 |

OTHER PUBLICATIONS

International Search Report issued May 19, 2009 in PCT/JP09/057404 filed Apr. 10, 2009.

* cited by examiner

*Primary Examiner* — Erin D Bishop
(74) *Attorney, Agent, or Firm* — Oblon, Spivak, McClelland, Maier & Neustadt, L.L.P.

(57) ABSTRACT

A control device limiting an input torque to an automatic shifting portion before initiation of an inertia phase in a downshift as compared to a case of not executing the downshift, wherein in an input torque limiting control, if an accelerator variation before a start of the downshift is equal to or less than a predetermined accelerator variation limit, the control device limits the input torque before the initiation of the inertia phase to the input torque at a time of a shifting output commanding the execution of the downshift, and wherein if an accelerator variation before the start of the downshift is greater than the accelerator variation limit, the control device limits the input torque before the initiation of the inertia phase equal to or less than a predetermined input torque limit value larger than the input torque at the time of the shifting output.

18 Claims, 11 Drawing Sheets

|     | C1 | C2 | B1 | B2 | B3 | GEAR RATIO | STEP |
|-----|----|----|----|----|----|------------|------|
| 1st | ○  |    |    |    | ○  | 3.357      | 1.54 |
| 2nd | ○  |    |    | ○  |    | 2.180      | 1.53 |
| 3rd | ○  |    | ○  |    |    | 1.424      | 1.42 |
| 4th | ○  | ○  |    |    |    | 1.000      | TOTAL 3.36 |
| R   |    | ○  |    |    | ○  | 3.209      |      |
| N   |    |    |    |    |    |            |      |

○ ENGAGEMENT

CONTROL DEVICE FOR VEHICLE DRIVE DEVICE

TECHNICAL FIELD

The present invention relates to a control device for a vehicle drive device, and, more particularly, to a drive force control upon a downshift of an automatic transmission.

BACKGROUND ART

A vehicle drive device has hitherto been known that includes an engine whose output torque is adjusted by a throttle position of an electronic throttle valve , and an automatic transmission performing a clutch-to-clutch shift that makes up part of a power transmission path between the engine and drive wheels. An example thereof is a vehicle controller of Patent Document 1. A control device of the vehicle controller disclosed in Patent Document 1 basically opens the electronic throttle valve to a greater extent to increase the engine torque according as a depressing amount (an operating amount) of an accelerator pedal becomes large. However, when a similar throttle position control is provided at the time of a power-on downshift during which the downshift of the automatic transmission is performed as a result of depressing the accelerator pedal, as depicted in FIG. 12 the output torque of the automatic transmission rises at a portion A1 in response to the depressing amount of the accelerator pedal, falls at a portion A2 since a clutch torque capacity within the automatic transmission lowers temporarily due to the clutch-to-clutch shift, and again rises at a portion A3 the instant the clutch torque capacity recovers. Thus, when two-stage acceleration shocks occur as indicated by the portions A1 and A3, there was a possibility that the driver may feel a sense of discomfort. To alleviate the two-stage acceleration shocks, the control device of the vehicle controller of Patent Document 1 limits the engine torque, i.e., an input torque to the automatic transmission up to the start of an inertia phase of the downshift at the time of the power-on downshift.

PRIOR ART DOCUMENTS

Patent Documents

Patent Document 1: Japanese Laid-Open Patent Publication No. 2007-91193

Patent Document 2: Japanese Laid-Open Patent Publication No. 2004-316831

SUMMARY OF THE INVENTION

Problem to Be Solved by the Invention

Although the control device of the vehicle controller of Patent Document 1 is capable of alleviating the two-stage acceleration shocks by the limitation of the input torque to the automatic transmission, a prompt rise of the drive force is desired in response to the operation of the acceleration pedal since the acceleration pedal is being depressed. Therefore, if the input torque to the automatic transmission is uniformly limited upon the power-on downshift as in the control device of the vehicle controller of Patent Document 1, there was a possibility that the initial responsivity may worsen due to a delay in the rise of the output torque of the automatic transmission. Such a problem is still publicly unknown.

An object of the present invention is to provide a control device for a vehicle drive device capable of suppressing worsening of the initial responsivity while alleviating the two-stage acceleration shocks upon the power-on downshift.

The object indicated above can be achieved according to a first aspect of the present invention, which provides (a) a control device for a vehicle drive device in a vehicle having a power source including an engine and a stepped automatic shifting portion making up a part of a power transmission path between the power source and a drive wheel, the control device providing input torque limiting control if a downshift of the automatic shifting portion is executed during an accelerator depressing operation, to limit an input torque to the automatic shifting portion before initiation of an inertia phase in the downshift as compared to the case of not executing the downshift, wherein (b) in the input torque limiting control, if an accelerator variation before the start of the downshift is equal to or less than a predetermined accelerator variation limit, the control device limits the input torque before the initiation of the inertia phase to the input torque at the time of a shifting output commanding the execution of the downshift, and wherein if an accelerator variation before the start of the downshift is greater than the accelerator variation limit, the control device limits the input torque before the initiation of the inertia phase equal to or less than a predetermined input torque limit value larger than the input torque at the time of the shifting output.

The object indicated above can be achieved according to a second aspect of the present invention, which provides the control device for a vehicle drive device of the first aspect of the invention, wherein (a) the accelerator variation corresponds to an accelerator operation speed, and wherein (b) the accelerator variation limit is a predetermined accelerator operation speed determination value for the accelerator operation speed.

The object indicated above can be achieved according to a third aspect of the present invention, which provides the control device for a vehicle drive device of the first or second aspect of the invention, wherein (a) the accelerator variation corresponds to an accelerator operation amount, and wherein (b) the accelerator variation limit is a predetermined accelerator operation amount determination value for the accelerator operation amount.

The object indicated above can be achieved according to a fourth aspect of the present invention, which provides the control device for a vehicle drive device of any one of the first to third aspects of the invention, wherein (a) the power source is made up of the engine capable of transmitting power to an input rotating member of the automatic shifting portion and one or two or more electric motors, and wherein (b) if a downshift of the automatic shifting portion is executed during an accelerator depressing operation, the input torque limiting control is provided by output torque limitation of the one or two or more electric motors.

The object indicated above can be achieved according to a fifth aspect of the present invention, which provides the control device for a vehicle drive device of the fourth aspect of the invention, wherein (a) the power source includes a first electric motor and a second electric motor included in the one or two or more electric motors, wherein (b) the control device is disposed with a electric storage device capable of giving/receiving electric power to/from each of the first electric motor and the second electric motor, wherein (c) during charging power limitation while a charging power to the electric storage device is limited lower than a predetermined allowable charging power, the input torque limiting control is provided by the output torque limitation of the first electric motor or the second electric motor that has an electric power balance of the electric storage device toward the discharging side, and wherein if not during the charging power limitation, the input torque limiting control is provided by the output torque limitation of the first electric motor or the second electric motor that is associated with the electric power balance of the electric storage device toward the charging side.

The object indicated above can be achieved according to a sixth aspect of the present invention, which provides the control device for a vehicle drive device of the fifth aspect of the invention, wherein (a) the power source includes a differential mechanism having different rotating elements respectively coupled in a power transmittable manner to the engine, the first electric motor, and the input rotating member, wherein (b) the second electric motor is coupled in a power transmittable manner to the input rotating member, and wherein (c) the differential state of the differential mechanism is controlled by controlling an operation state of the first electric motor.

The object indicated above can be achieved according to a seventh aspect of the present invention, which provides the control device for a vehicle drive device of the sixth aspect of the invention, wherein during discharging power limitation while a discharging power of the electric storage device is limited lower than a predetermined allowable discharging power as well as the charging power limitation, the input torque limiting control is provided by the output torque limitation of the first electric motor and the second electric motor on the condition that one of the first electric motor and the second electric motor generates electric power while the other consumes electric power.

The object indicated above can be achieved according to a eighth aspect of the present invention, which provides the control device for a vehicle drive device of any one of the first to seventh aspects of the invention, wherein in the input torque limiting control, the input torque to the automatic shifting portion before the initiation of the inertia phase is limited as compared to the case of not executing the shift of the automatic shifting portion.

The object indicated above can be achieved according to a ninth aspect of the present invention, which provides the control device for a vehicle drive device of any one of the first to eighth aspects of the invention, wherein if the output torque of the automatic shifting portion at the time of the shifting output is equal to or greater than a predetermined output torque determination value, the control device determines that the accelerator variation before the start of the downshift is equal to or less than the accelerator variation limit, and wherein (b) if the output torque of the automatic shifting portion at the time of the shifting output is less than the output torque determination value, the control device determines that the accelerator variation before the start of the downshift is greater than the accelerator variation limit.

Advantages of the Invention

According to the control device for a vehicle drive device of the first aspect of the invention, if a downshift of the automatic shifting portion is executed during the accelerator depressing operation, the input torque limiting control means provides the input torque limiting control to limit the input torque before the initiation of the inertia phase in the downshift of the automatic shifting portion as compared to the case of not executing the downshift and, therefore, the two-stage acceleration shock can be alleviated during the power-on downshift. Since the engine torque has a certain amount of response delay to a throttle position change, if the accelerator variation is smaller, the engine torque is increased in a manner sufficiently following the accelerator variation while if the accelerator variation is larger, the engine torque is increased with a delay relative to the accelerator variation. Therefore, although it is contemplated that the input torque is increased to the extent that the initial response can be ensured to a level not causing deterioration at the time of the shifting output if the accelerator variation is smaller, it is contemplated that the input torque is not increased to the extent that the initial response can be ensured at the time of the shifting output if the accelerator variation is larger. In this regard, according to the control device of the first aspect of the invention, in the input torque limiting control, if the accelerator variation determining means determines that the accelerator variation is equal to or less than the accelerator variation limit, the input torque limiting control means limits the input torque before the initiation of the inertia phase in the downshift to the input torque at the time of the shifting output commanding the execution of the downshift while if the accelerator variation before the initiation of the downshift is greater than the accelerator variation limit, the input torque is limited before the initiation of the inertia phase equal to or less than a predetermined input torque limit value greater than the input torque at the time of the shifting output. Therefore, in consideration of the response delay of the input torque relative to the accelerator variation, if the accelerator variation is larger and the rising of the input torque is delayed, the input torque is limited when the input torque is increased to some extent and, therefore, the deterioration of the initial response can be suppressed while the two-stage acceleration shock is alleviated during the power-on downshift. Therefore, the improvement of the drivability may be achieved.

According to the control device for a vehicle drive device of the second aspect of the invention, the accelerator variation may correspond to the accelerator operation speed and the accelerator variation limit may be the accelerator operation speed determination value determined in advance for the accelerator operation speed. As a result, the upper limit value of the input torque to the automatic shifting portion in the input torque limiting control can be determined based on the accelerator operation speed.

According to the control device for a vehicle drive device of the third aspect of the invention, the accelerator variation may correspond to the accelerator operation amount and the accelerator variation limit may be the accelerator operation amount determination value determined in advance for the accelerator operation amount. As a result, the upper limit value of the input torque to the automatic shifting portion in the input torque limiting control can be determined based on the accelerator operation amount According to the control device for a vehicle drive device of the fourth aspect of the invention, (a) the power source is made up of the engine capable of transmitting power to an input rotating member of the automatic shifting portion and one or two or more electric motors, and (b) if a downshift of the automatic shifting portion is executed during an accelerator depressing operation, the input torque limiting control is provided by output torque limitation of the one or two or more electric motors. Therefore, it is not or almost not necessary to reduce the engine torque in order to limit the input torque to the automatic shifting portion, and after the end of the input torque limiting control, the input torque can be increased in a responsive manner depending on the accelerator variation to ensure sufficient initial response.

According to the control device for a vehicle drive device of the fifth aspect of the invention, (a) the power source includes a first electric motor and a second electric motor included in the one or two or more electric motors, wherein (b) the control device is disposed with a electric storage device capable of giving/receiving electric power to/from each of the first electric motor and the second electric motor, wherein (c) during charging power limitation while a charging power to the electric storage device is limited lower than a predetermined allowable charging power, the input torque limiting control is provided by the output torque limitation of the first electric motor or the second electric motor that has an electric power balance of the electric storage device toward the discharging side, and wherein if not during the charging power limitation, the input torque limiting control is provided by the output torque limitation of the first electric motor or the second electric motor that is associated with the electric power balance of the electric storage device toward the charging side. Therefore, even during the charging power limitation, the input torque limiting control may be provided to achieve the improvement of the drivability. If not during the charging power limitation, the charging of the electric storage device is promoted and the improvement of the fuel economy may consequently be achieved.

According to the control device for a vehicle drive device of the sixth aspect of the invention, (a) the power source includes a differential mechanism having different rotating elements respectively coupled in a power transmittable manner to the engine, the first electric motor, and the input rotating member, wherein (b) the second electric motor is coupled in a power transmittable manner to the input rotating member, and wherein (c) the differential state of the differential mechanism is controlled by controlling an operation state of the first electric motor. Therefore, since the gear ratio of the differential mechanism can continuously be changed by the first electric motor through the power transmission from the engine to the input rotating member, the engine can be driven such that the engine rotation speed is not restricted by the rotation speed of the input rotating member so as to improve the fuel economy of the vehicle.

According to the control device for a vehicle drive device of the seventh aspect of the invention, during discharging power limitation while a discharging power of the electric storage device is limited lower than a predetermined allowable discharging power as well as the charging power limitation, the input torque limiting control is provided by the output torque limitation of the first electric motor and the second electric motor on the condition that one of the first electric motor and the second electric motor generates electric power while the other consumes electric power. Therefore, even during both the discharging power limitation and the charging power limitation, the improvement of the drivability may be achieved by providing the input torque limiting control while the electric power balance of the electric storage device is brought closer to zero.

According to the control device for a vehicle drive device of the eighth aspect of the invention, in the input torque limiting control, the input torque to the automatic shifting portion before the initiation of the inertia phase is limited as compared to the case of not executing the shift of the automatic shifting portion. Therefore, the criteria of limiting the input torque can be clarified.

According to the control device for a vehicle drive device of the ninth aspect of the invention, if the output torque of the automatic shifting portion at the time of the shifting output is equal to or greater than a predetermined output torque determination value, the control device determines that the accelerator variation before the start of the downshift is equal to or less than the accelerator variation limit, and wherein if the output torque of the automatic shifting portion at the time of the shifting output is less than the output torque determination value, the control device determines that the accelerator variation before the start of the downshift is greater than the accelerator variation limit. As a result, the upper limit value of the input torque in the input torque limiting control can be determined based on the output torque of the automatic shifting portion by calculating or detecting the output torque of the automatic shifting portion.

Preferably, in the power transmission path between the engine and the drive wheels, the engine, the differential mechanism, the automatic transmission, and the drive wheels are coupled together in the mentioned order.

MODES FOR CARRYING OUT THE INVENTION

An embodiment of the present invention will now be described with reference to the drawings. In the following embodiment, the diagrams are properly simplified or deformed and the dimensional ratios, shapes, etc. of parts are not necessarily accurately drawn.

Embodiment

Figures 1, 2:
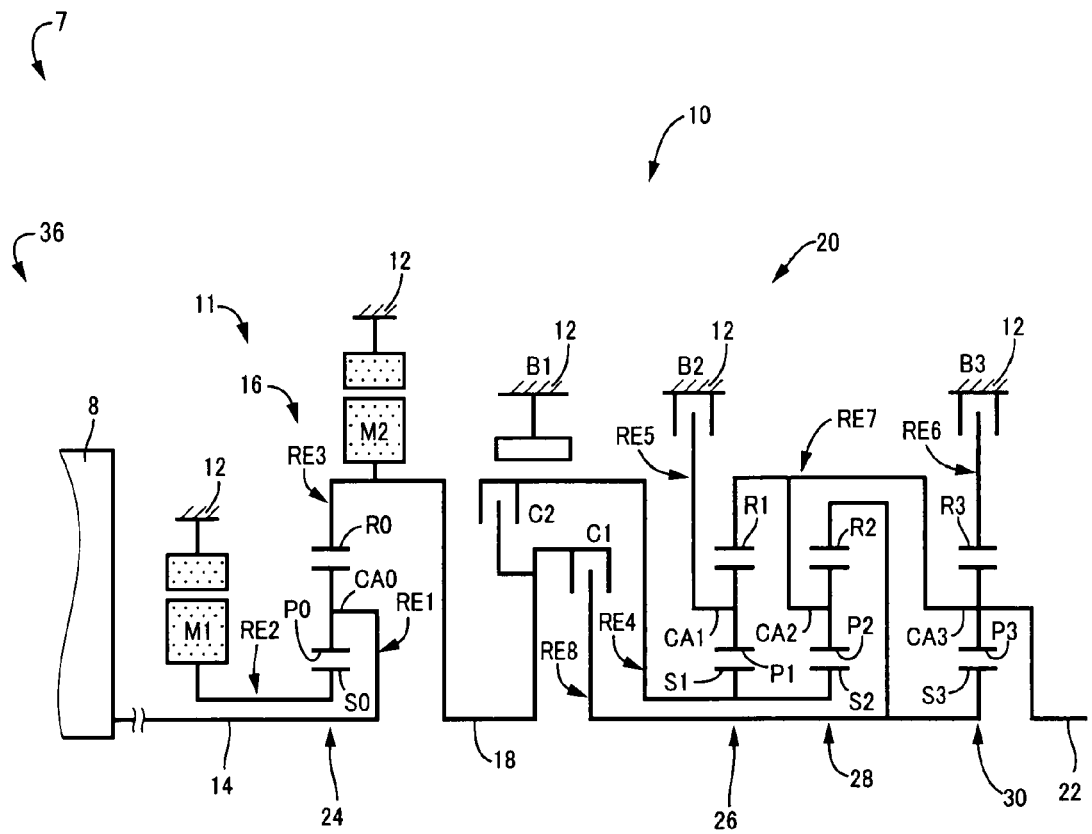
FIG. 1 is a schematic for explaining a main part of a vehicle drive device making up a vehicle to which the present invention is applied.
FIG. 2 is an operation table for explaining a relationship between the shift operation of the automatic shifting portion provided in the vehicle drive device in FIG. 1 and the operation of the hydraulic friction engagement device used for it.

FIG. 1 is a schematic for explaining a main part of a vehicle drive device making up a vehicle 6 (see FIG. 6) to which the present invention is applied. In FIG. 1, the vehicle drive device 7 (hereinafter, referred to as "drive device 7") includes an engine 8 as a drive force source for running that is an internal combustion engine such as a gasoline engine or a diesel engine, and a power transmission device 10, the engine 8 being coupled directly or substantially directly via a pulsation absorbing damper not shown to an input shaft 14 of the power transmission device 10. The power transmission device 10 includes, in series, an input shaft 14 as an input rotating member disposed on a common axis in a transmission case 12 (hereinafter, referred to as the case 12) that is a non-rotating member attached to a vehicle body; a differential portion 11 as a stepless shifting portion coupled to the input shaft 14 directly or indirectly via a pulsation absorbing damper (vibration damping device) not shown; an automatic shifting portion 20 as a mechanical power transmitting portion serially coupled via a transmitting member (transmitting shaft) 18 on a power transmission path between the differential portion 11 and drive wheels 34 (see FIG. 6); and an output shaft 22 as an output rotating member coupled to the automatic shifting portion 20. The power transmission device 10 is preferably used for, for example, an FR (front-engine rear-drive) type hybrid vehicle with the power transmission device 10 longitudinally placed in the vehicle, and is disposed between the engine 8 and a pair of the drive wheels 34 to transmit a power from the engine 8 sequentially through a differential gear device (final reduction device) 32 (see FIG. 6) making up a part of the power transmission path and a pair of axles etc., to a pair of the drive wheels 34.

Thus, in the power transmission device 10 of this embodiment, the engine 8 is directly coupled to the differential portion 11. This direct coupling means that the coupling is achieved without the intervention of a fluid type power transmission device such as a torque converter or a fluid coupling, and this direct coupling encompasses, for example, a coupling through the pulsation absorbing damper. In the drive device 7, the engine 8 and the differential portion 11 having a first electric motor M1 and a second electric motor M2 make up a power source 36 for supplying a torque to the automatic shifting portion 20. That is, all of the engine 8, the first electric motor M1, and the second electric motor M2 are disposed on the transmitting member 18 as the input rotating member of the automatic shifting portion 20 in a power transmittable manner. Since the power transmission device 10 is configured symmetrically with respect t its shaft center, the lower half thereof is not shown in the schematic of FIG. 1.

The differential portion 11 includes a power distribution mechanism 16 that is a mechanical mechanism mechanically distributing the output of the engine 8 input to the input shaft 14 and that acts as a differential mechanism distributing the output of the engine 8 to the first electric motor M1 and the transmitting member 18, the first electric motor M1 coupled to the power distribution mechanism 16 in a power transmittable manner, and the second electric motor M2 operatively coupled to the transmitting member 18 so as to rotate integrally therewith. Although the first electric motor M1 and the second electric motor M2 of this embodiment are so-called motor generators that have an electric generation function, the first electric motor M1 functioning as a differential electric motor for controlling the differential state of the power distribution mechanism 16 has at least a generator (electric generation) function for generating a reaction force. The second electric motor M2 coupled to the drive wheels 34 in a power transmittable manner has at least a motor (electric motor) function to act as a running electric motor that outputs a drive force as a drive force source for running. The first electric motor M1 and the second electric motor M2 correspond to one or more electric motors of the present invention.

The power distribution mechanism 16 is a differential mechanism disposed between the engine 8 and the drive wheels 34 and includes different rotating elements RE1, RE2, and RE3 coupled respectively to the engine 8, the first electric motor M1, and the transmitting member 18. Specifically, the power distribution mechanism 16 is made up mainly of a single pinion type differential portion planetary gear device 24. The differential portion planetary gear device 24 has a predetermined gear ratio $\rho 0$ of the order of "0.418" for example and includes as its rotating elements (elements) a differential portion sun gear S0, a differential portion planetary gear P0, a differential portion carrier CA0 that supports the differential portion planetary gear P0 in a rotatable and revolvable manner, and a differential portion ring gear R0 engaging with the differential portion sun gear S0 via the differential portion planetary gear P0. When ZS0 denotes the number of teeth of the differential portion sun gear S0 and ZR0 denotes the number of teeth of the differential portion ring gear R0, the gear ratio $\rho 0$ is ZS0/ZR0.

In this power distribution mechanism 16, the differential portion carrier CA0 is coupled to the input shaft 14, i.e., the engine 8; the differential portion sun gear S0 is coupled to the first electric motor M1; and the differential portion ring gear R0 is coupled to the transmitting member 18. The power distribution mechanism 16 configured as described above is put into a differential state where a differential action is made operative, i.e., the differential action is achieved by enabling the three elements of the differential portion planetary gear device 24, i.e., the differential portion sun gear S0, the differential portion carrier CA0, and the differential portion ring gear R0 to rotate relative to each other and, therefore, the output of the engine 8 is distributed to the first electric motor M1 and the transmitting member 18, and since the electric energy generated by the first electric motor M1 from a part of the distributed output of the engine 8 is accumulated and used for rotationally driving the second electric motor M2, the differential potion 11 (the power distribution mechanism 16) is allowed to function as an electric differential device and, for example, the differential portion 11 is put into a so-called stepless shifting state (electric CVT state), and the rotation of the transmitting member 18 is continuously varied regardless of a predetermined rotation of the engine 8. Therefore, the differential portion 11 functions as an electric continuously variable transmission with a gear ratio $\gamma 0$ (rotation speed $N_{IN}$ of the input shaft 14/rotation speed $N_{18}$ of the transmitting member 18) continuously varied from a minimum value $\gamma 0 \min$ to a maximum value $\gamma 0 \max$.

The automatic shifting portion 20 forms part of the power transmission path from the power source 36 to the drive wheels 34, includes a single pinion type first planetary gear device 26, a single pinion type second planetary gear device 28, and a single pinion type third planetary gear device 30, and is a planetary-gear type multistage transmission acting as a stepped automatic transmission. The first planetary gear device 26 includes a first sun gear S1, a first planetary gear P1, a first carrier CA1 that supports the first planetary gear P1 in a rotatable and revolvable manner, and a first ring gear R1 engaging with the first sun gear S1 via the first planetary gear P1 and has a predetermined gear ratio $\rho 1$ of the order of "0.562" for example. The second planetary gear device 28 includes a second sun gear S2, a second planetary gear P2, a second carrier CA2 that supports the second planetary gear P2 in a rotatable and revolvable manner, and a second ring gear R2 engaging with the second sun gear S2 via the second planetary gear P2 and has a predetermined gear ratio $\rho 2$ of the order of "0.425" for example. The third planetary gear device 30 includes a third sun gear S3, a third planetary gear P3, a third carrier CA3 that supports the third planetary gear P3 in a rotatable and revolvable manner, and a third ring gear R3 engaging with the third sun gear S3 via the third planetary gear P3 and has a predetermined gear ratio $\rho 3$ of the order of "0.421" for example. When ZS1, ZR1, ZS2, ZR2, ZS3, and ZR3 denote the numbers of teeth, respectively, of the first sun gear S1, the first ring gear R1, the second sun gear S2, the second ring gear R2, the third sun gear S3, and the third ring gear R3, the gear ratios $\rho 1$, $\rho 2$, and $\rho 3$ are ZS1/ZR1, ZS2/ZR2, and ZS3/ZR3, respectively.

In the automatic shifting portion 20, the first sun gear S1 and the second sun gear S2 are integrally coupled together, selectively coupled via a second clutch C2 to the transmitting member 18, and selectively coupled via a first brake B1 to the case 12; the first carrier CA1 is selectively coupled via a second brake B2 to the case 12; the third ring gear R3 is selectively coupled via a third brake B3 to the case 12; the first ring gear R1, the second carrier CA2, and the third carrier CA3 are integrally coupled together and coupled to the output shaft 22; and the second ring gear R2 and the third sun gear S3 are integrally coupled together and selectively coupled via a first clutch C1 to the transmitting member 18.

In this manner, the interior of the automatic shifting portion 20 and the differential portion 11 (the transmitting member 18) are selectively coupled to each other via the first clutch C1 or the second clutch C2 that is used to establish a shifting stage of the automatic shifting portion 20. In other words, the first clutch C1 and the second clutch C2 function as engagement devices that selectively switch the power transmission path between the transmitting member 18 and the automatic shifting portion 20, i.e., the power transmission path from the differential portion 11 (transmitting member 18) to the drive wheels 34, between a power transmittable state that enables the power transmission through the power transmission path and a power transmission interrupted state that interrupts the power transmission through the power transmission path. That is, the power transmission path is put in the power transmittable state by engaging at least one of the first clutch C1 and the second clutch C2, whereas the power transmission path is put in the power interrupted state by releasing both the first clutch C1 and the second clutch C2.

In this automatic shifting portion 20, a clutch-to-clutch shift is executed by the release of release-side engagement devices and by the engagement of engagement-side engagement devices and gear stages (shift stages) are selectively established to acquire a gear ratio $\gamma$(=rotation speed $N_{18}$ of the transmitting member 18/rotation speed $N_{OUT}$ of the output shaft 22) varying in substantially equal ratio for each gear stage. For example, as depicted in an engagement operation table of FIG. 2, the engagement of the first clutch C1 and the third brake B3 establishes a first speed gear stage whose gear ratio $\gamma 1$ is for example of the order of "3.357" that is the maximum value; the engagement of the first clutch C1 and the second brake B2 establishes a second speed gear stage whose gear ratio $\gamma 2$ is for example of the order of "2.180" that is smaller than the first speed gear stage; the engagement of the first clutch C1 and the first brake B1 establishes a third speed gear stage whose gear ratio $\gamma 3$ is for example of the order of "1.424" that is smaller than the second speed gear stage; and the engagement of the first clutch C1 and the second clutch C2 establishes a fourth speed gear stage whose gear ratio $\gamma 4$ is for example of the order of "1.000" that is smaller than the third speed gear stage. The engagement of the second clutch C2 and the third brake B3 establishes a reverse gear stage (reverse shift stage) whose gear ratio $\gamma R$ is for example of the order of "3.209" that is a value between the first speed gear stage and the second speed gear stage. A neutral "N" state is achieved by the release of the first clutch C1, the second clutch C2, the first brake B1, the second brake B2, and the third brake B3.

The first clutch C1, the second clutch C2, the first brake B1, the second brake B2, and the third brake B3 (hereinafter, referred to simply as clutches C and brakes B if not particularly distinguished) are hydraulic friction engagement devices acting as engagement elements frequently used in conventional vehicle automatic transmissions and are made up as a wet multi-plate type having a hydraulic actuator pressing a plurality of friction plates overlapped with each other or as a band brake having a hydraulic actuator fastening one end of one or two bands wrapped around an outer peripheral surface of a rotating drum, for the purpose of selectively coupling members on the both sides of the devices interposed therebetween.

In the power transmission device 10 configured as described above, a continuously variable transmission is made up generally of the differential portion 11 functioning as a continuously variable transmission and the automatic shifting portion 20. The differential portion 11 and the automatic shifting portion 20 can form the state equivalent to a stepped transmission by providing control such that the gear ratio of the differential portion 11 is kept constant.

Specifically, when the differential portion 11 functions as a continuously variable transmission and the automatic transmission 20 in series with the differential portion 11 functions as a stepped transmission, the rotation speed input to the automatic shifting portion 20, i.e., the rotation speed of the transmitting member 18 (hereinafter, transmitting member rotation speed $N_{18}$) is varied in a stepless manner for at least one gear stage M of the automatic shifting portion 20, and a stepless gear ratio width is acquired in the gear stage M. Therefore, a general gear ratio $\gamma T$ (=rotation speed $N_{IN}$ of the input shaft 14/rotation speed $N_{OUT}$ of the output shaft 22) of the power transmission device 10 is acquired in a stepless manner and a continuously variable transmission is formed in the power transmission device 10. The general gear ratio $\gamma T$ of the power transmission device 10 is a total gear ratio $\gamma T$ of the entire power transmission device 10 generated based on the gear ratio $\gamma 0$ of the differential portion 11 and the gear ratio $\gamma$ of the automatic shifting portion 20.

For example, the transmitting portion rotation speed $N_{18}$ is varied in a stepless manner for each gear stage of the first to fourth speed gear stages and the reverse gear stage of the automatic shifting portion 20 depicted in the engagement operation table of FIG. 2 so that a stepless gear ratio width is acquired in each gear stage. Therefore, a gear ratio continuously variable in a stepless manner is achieved between the gear stages and the total gear ratio $\gamma T$ is acquired in a stepless manner for the entire power transmission device 10.

When the gear ratio of the differential portion 11 is controlled to be kept constant and the clutches C and the brakes B are selectively engaged and actuated to selectively establish any one of the first to fourth speed gear stages or the reverse gear stage (reverse shift stage), the total gear ratio $\gamma T$ of the power transmission device 10 varying in substantially equal ratio is acquired for each gear stage. Therefore, the state equivalent to a stepped transmission is formed in the power transmission device 10.

For example, when control is provided such that the gear ratio γ0 of the differential portion 11 is fixed at "1", the total gear ratio γT of the power transmission device 10 is acquired for each gear stage correspondingly to each gear stage of the first to fourth gear stages and the rear gear stage of the automatic shifting portion 20 as depicted in the engagement operation table of FIG. 2. When control is provided such that the gear ratio γ0 of the differential portion 11 is fixed at a value smaller than "1", e.g., of the order of 0.7 in the fourth gear stage of the automatic shifting portion 20, the total gear ratio γT of a value smaller than the fourth gear stage, e.g., of the order of "0.7" is acquired.

Figure 3:
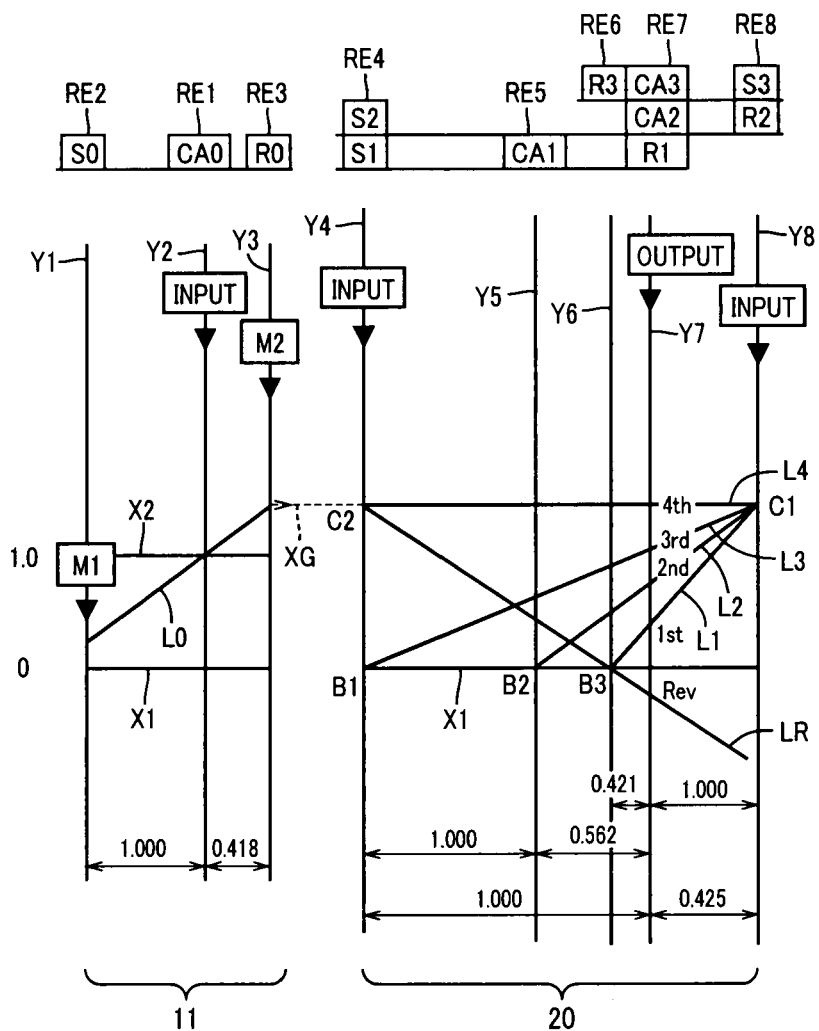
FIG. 3 depicts a collinear diagram for explaining the relative rotation speeds of the rotating elements for each gear stage in the vehicle drive device in FIG. 1.

FIG. 3 depicts a collinear diagram capable of representing on straight lines the relative relationships of the rotation speeds of the rotating elements having a different coupling state for each gear stage in the power transmission device 10 made up of the differential portion 11 and the automatic shifting portion 20. The collinear diagram of FIG. 3 represents two-dimensional coordinates defined by a horizontal axis indicative of a relationship of the gear ratios ρ of the planetary gear devices 24, 26, 28, and 30 and a vertical axis indicative of a relative rotation speed, with a horizontal line X1 indicating a zero rotation speed, a horizontal line X2 indicating a rotation speed "1.0", i.e., a rotation speed $N_E$ of the engine 8 coupled to the input shaft 14, and a horizontal line XG indicating a rotation speed of the transmitting member 18.

Three vertical lines Y1, Y2, and Y3 corresponding to the three elements of the power distribution mechanism 16 making up the differential portion 11 indicate relative rotation speeds of, in the order from left to right, the differential portion sun gear S0 corresponding to the second rotating element (second element) RE2, the differential portion carrier CA0 corresponding to the first rotating element (first element) RE1, and the differential portion ring gear R0 corresponding to the third rotating element (third element) RE3, and the intervals therebetween are determined depending on the gear ratio ρ0 of the differential portion planetary gear device 24. Five vertical lines Y4, Y5, Y6, Y7, and Y8 of the automatic shifting portion 20 respectively represents, in the order from left to right, the first sun gear S1 and the second sun gear S2 mutually-coupled and corresponding to a fourth rotating element (fourth element) RE4; the first carrier CA1 corresponding to a fifth rotating element (fifth element) RE5; the third ring gear R3 corresponding to a sixth rotating element (sixth element) RE6; the first ring gear R1, the second carrier CA2, and the third carrier CA3 mutually-coupled and corresponding to a seventh rotating element (seventh element) RE7; and the second ring gear R2 and the third ring gear S3 mutually-coupled and corresponding to an eighth rotating element (eight element) RE8, and the intervals therebetween are determined depending on the gear ratios ρ1, ρ2, and ρ3 of the first, the second and the third planetary gear devices 26, 28, and 30. In the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the differential portion 11, the interval corresponding to "1" is set between the vertical lines Y1 and Y2, and the interval between the vertical lines Y2 and Y3 is set to the interval corresponding to the gear ratio ρ0. In the case of the automatic shifting portion 20, the interval corresponding to "1" is set between the sun gear and the carrier of each of the first, the second, and the third planetary gear devices 26, 28, and 30, and the interval corresponding to ρ is set between the carrier and the ring gear.

When the power transmission device 10 of this embodiment is represented by using the collinear diagram of FIG. 3, the power distribution mechanism 16 (the differential portion 11) is configured such that the first rotating element RE1 (the differential portion carrier CA0) of the differential portion planetary gear device 24 is coupled to the input shaft 14, i.e., the engine 8; that the second rotating element RE2 is coupled to the first electric motor M1; that the third rotating element (the differential portion ring gear R0) RE3 is coupled to the transmitting member 18 and the second electric motor M2, so that the rotation of the input shaft 14 is transmitted (input) via the transmitting member 18 to the automatic shifting portion 20. A diagonal straight line L0 passing through the intersection point of Y2 and X2 indicates the relationship between the rotation speed of the differential portion sun gear S0 and the rotation speed of the differential portion ring gear R0.

For example, the differential portion 11 is put in a differential state where the first rotating element RE1 to the third rotating element RE3 are enabled to rotate relative to each other and, if the rotation speed of the differential portion ring gear R0 indicated by the intersecting point between the line L0 and the vertical line Y3 is restricted and kept substantially constant at the vehicle speed V, when the engine rotation speed $N_E$ is controlled to increase or decrease the rotation speed of the differential portion carrier CA0 indicated by the intersecting point between the line L0 and the vertical line Y2, the rotation speed of the differential portion sun gear S0 indicated by the intersecting point between the line L0 and the vertical line Y1, i.e., the rotation speed of the first electric motor M1 is increased or decreased.

When the rotation speed of the first electric motor M1 is controlled such that the gear ratio γ0 of the differential portion 11 is fixed at "1" to set the rotation of the differential portion sun gear S0 to a rotation equal to the engine rotation speed $N_E$, the line L0 is matched to the horizontal line X2, and the rotation speed of the differential portion ring gear R0, i.e., the transmitting member 18 is rotated at the same rotation as the engine rotation speed $N_E$. Alternatively, when the rotation speed of the first electric motor M1 is controlled such that the gear ratio γ0 of the differential portion 11 is fixed at a value smaller than "1", for example, of the order of 0.7 to set the rotation of the differential portion sun gear S0 to zero, the transmitting member 18 is rotated at a rotation speed $N_{18}$ increased from the engine rotation speed $N_E$.

In the automatic shifting portion 20, the fourth rotating element RE4 is selectively coupled via the second clutch C2 to the transmitting member 18 and is selectively coupled via the first brake B1 to the case 12; the fifth rotating element RE5 is coupled via the second brake B2 to the case 12; the sixth rotating element RE6 is selectively coupled via the third brake B3 to the case 12; the seventh rotating element RE7 is selectively coupled to the output shaft 22; and the eighth rotating element RE8 is selectively coupled via the first clutch C1 to the transmitting member 18.

In the automatic shifting portion 20, when rotation of the transmitting member 18 (third rotating element RE3) acting as the output rotating member in the differential portion 11 is input to the eighth rotating element RE8 as a result of the engagement of the first clutch C1, as depicted in FIG. 3, the first clutch C1 and the third brake B3 are engaged, whereupon the rotation speed of the output shaft 22 at a first speed (1st) is indicated by the intersecting point between a diagonal straight line L1 passing through the intersecting point between the vertical line Y8 indicative of the rotation speed of the eighth rotating element RE8 and the horizontal line XG and through the intersecting point between the vertical line Y6 indicative of the rotation speed of the sixth rotating element RE6 and the horizontal line X1, and the vertical line Y5 indicative of the rotation speed of the seventh rotating element RE7 coupled to the output shaft 22. Similarly, the rotation speed of the output shaft 22 at a second speed (2nd) is indicated by the intersecting point between a diagonal straight line L2 determined as a result of the engagement of the first clutch C1 and the second brake B2 and the vertical line Y7 indicative of the rotation speed of the seventh rotating element RE7 coupled to the output shaft 22; the rotation speed of the output shaft 22 at a third speed (3rd) is indicated by the intersecting point between a diagonal straight line L3 determined as a result of the engagement of the first clutch C1 and the first brake B1 and the vertical line Y7 indicative of the rotation speed of the seventh rotating element RE7 coupled to the output shaft 22; and the rotation speed of the output shaft 22 at a fourth speed (4th) is indicated by the intersecting point between a horizontal straight line L4 determined as a result of the engagement of the first clutch C1 and the second clutch C2 and the vertical line Y7 indicative of the rotation speed of the seventh rotating element RE7 coupled to the output shaft 22.

Figure 4:
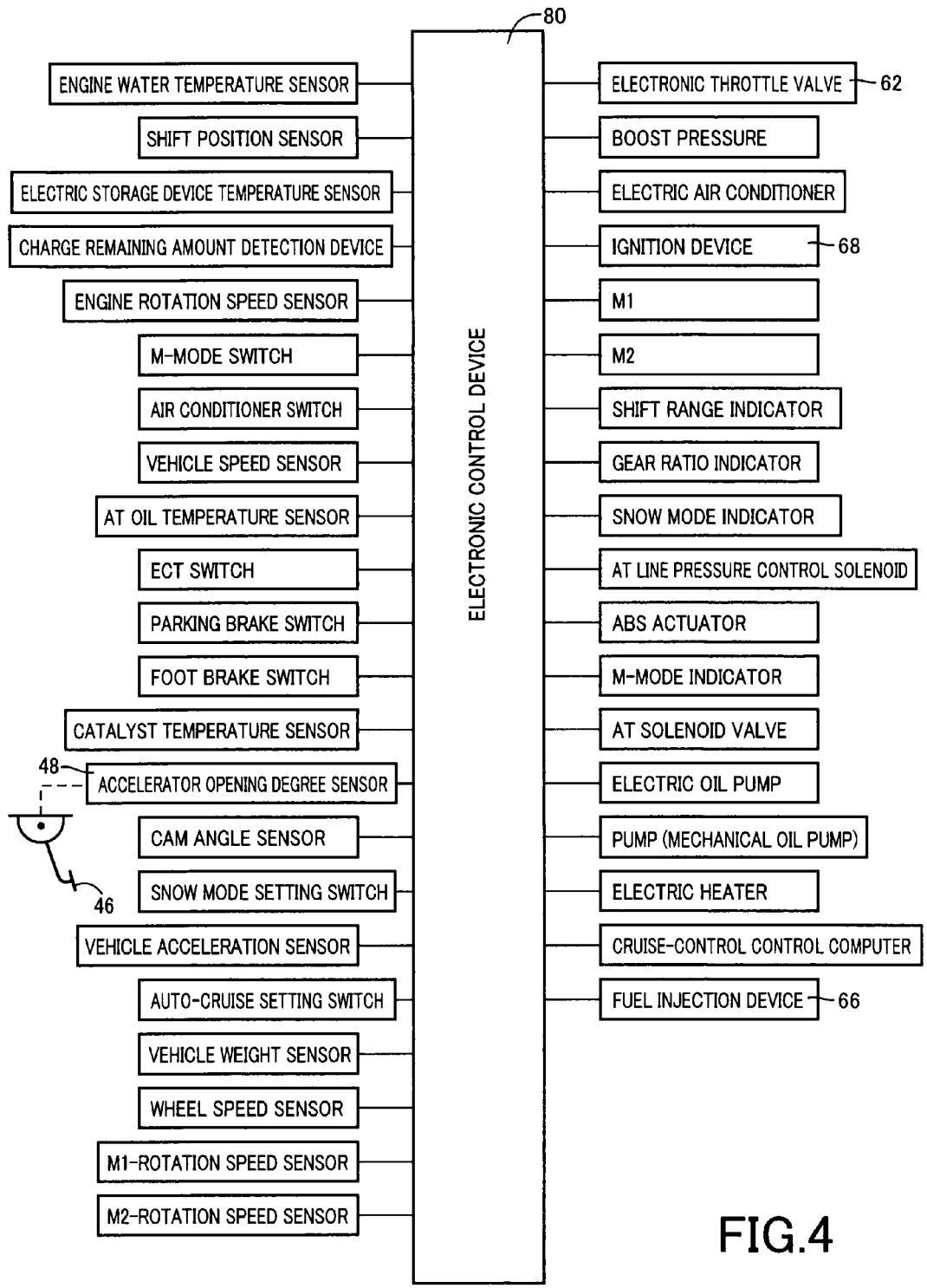
FIG. 4 illustrates input and output signals of the electronic control device provided in the vehicle drive device in FIG. 1.

FIG. 4 exemplarily illustrates signals input to an electronic control device 80 of this embodiment and signals output from the electronic control device 80. The electronic control device 80 functions as a controller for controlling the drive device 7 and includes a so-called microcomputer made up of a CPU, a ROM, a RAM, an I/O interface, etc., and executes signal processes in accordance with programs stored in advance in the ROM, while utilizing a temporary storage function of the RAM, to provide drive controls such as the hybrid drive control related to the engine 8 and the first and second electric motors M1 and M2 and the shift control of the automatic shifting portion 20.

The electronic control device 80 is supplied, from sensors, switches, etc., as depicted in FIG. 4, with a signal indicative of an engine water temperature $TEMP_W$, signals indicative of a shift position $P_{SH}$ of a shift lever 52 (see FIG. 5) and the number of operations at an "M" position, a signal indicative of a temperature $TEMP_{BAT}$ of a electric storage device 56 (see FIG. 6), a signal indicative of a charge remaining amount (charging state) SOC of the electric storage device 56, a signal indicative of the engine rotation speed $N_E$ that is the rotation speed of the engine 8, a signal indicative of a gear ratio train setup value; a signal giving a command for an M-mode (manual shift running mode), a signal indicative of an operation of an air conditioner, a signal indicative of a vehicle speed V corresponding to the rotation speed (hereinafter, output shaft rotation speed) $N_{OUT}$ of the output shaft 22, a signal indicative of an operating oil temperature $T_{OIL}$ of the automatic shifting portion 20, a signal indicative of a parking brake operation, a signal indicative of a foot brake operation, a signal indicative of a catalyst temperature, a signal from an accelerator opening degree sensor 48 indicative of an accelerator opening degree Acc (the depressing direction of the accelerator is a positive direction) that is an amount of depressing (accelerator operating amount) of an accelerator pedal 46 corresponding to an output request amount of a driver, a signal indicative of a cam angle, a signal indicative of a snow mode setup, a signal indicative of a longitudinal acceleration G of a vehicle, a signal indicative of auto-cruise running, a signal indicative of a weight of a vehicle (vehicle weight), a signal indicative of a wheel speed for each of wheels, a signal indicative of a rotation speed $N_{M1}$ (hereinafter, first electric motor rotation speed $N_{M1}$) of the first electric motor M1, a signal indicative of a rotation speed $N_{M2}$ (hereinafter, second electric motor rotation speed $N_{M2}$) of the second electric motor M2, etc.

The electronic control device 80 outputs control signals to an engine output control device 58 (see FIG. 6) that controls the engine output, for example, a drive signal to a throttle actuator 64 that operates a throttle valve opening degree $θ_{TH}$ of an electronic throttle valve 62 disposed in an intake pipe 60 of the engine 8, a fuel supply amount signal that controls a fuel supply amount into the intake pipe 60 or the cylinders of the engine 8 from a fuel injection device 66, an ignition signal that gives a command for the timing of the ignition of the engine 8 by an ignition device 68, a boost pressure adjusting signal for adjusting a boost pressure, an electric air conditioner drive signal for activating an electric air conditioner, command signals that gives commands for the operations of the electric motors M1 and M2, a shift position (operational position) display signal for activating a shift indictor, a gear ratio display signal for displaying a gear ratio, a snow mode display signal for displaying that the snow mode is in operation, an ABS activation signal for activating an ABS actuator that prevents wheels from slipping at the time of braking, an M-mode display signal for displaying that the M-mode is selected, a valve command signal for activating an electromagnetic valve (linear solenoid valve) included in a hydraulic control circuit 70 (see FIG. 6) so as to control the hydraulic actuator of the hydraulic friction engagement devices of the differential portion 11 and the automatic shifting portion 20, a signal for regulating a line oil pressure $P_L$ with a regulator valve (pressure regulating valve) disposed in the hydraulic control circuit 70, a drive command signal for activating an electric hydraulic pump that is an oil pressure source of an original pressure for regulating the line oil pressure $P_L$, a signal for driving an electric heater, a signal to a computer for controlling the cruise control, etc.

Figure 5:
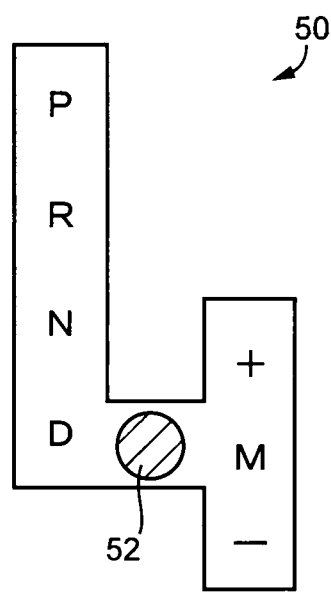
FIG. 5 is a diagram of an example of a shift operation device for selecting a plurality of types of the shift positions having the shift lever for the shift operation of the vehicle drive device in FIG. 1.

FIG. 5 is a diagram of an example of a shift operation device 50 as a switching device that switches a plurality of types of shift positions $P_{SH}$ through artificial manipulation. The shift operation device 50 is disposed next to a driver's seat, for example, and includes the shift lever 52 operated so as to select a plurality of types of the shift positions $P_{SH}$.

The shift lever 52 is arranged to be manually operated to a parking position "P (parking)" for being in a neutral state, i.e., neutral state with the power transmission path interrupted in the power transmission device 10, i.e., in the automatic shifting portion 20 and for locking the output shaft 22 of the automatic shifting portion 20; a backward running position "R (reverse)" for backward running; a neutral position "N (neutral)" for being in the neutral state with the power transmission path interrupted in the power transmission device 10; a forward automatic transmission running position "D (drive)" for achieving an automatic transmission mode to provide the automatic transmission control within an available variation range of the total gear ratio γT of the power transmission device 10 acquired from a stepless gear ratio width of the differential portion 11 and the gear stages subjected to the automatic transmission control within the range of the first speed gear stage to the fourth speed gear stage of the automatic shifting portion 20; or a forward manual transmission running position "M (manual)" for achieving a manual transmission running mode (manual mode) to set a so-called shift range that limits shift stages on the high-speed side in the automatic shifting portion 20.

A hydraulic control circuit 70 is electrically switched such that the reverse gear stage "R", the neutral "N", the shift stages in the forward gear stage "D", etc., described in the engagement operation table of FIG. 2 are established in conjunction with the manual operation of the shift lever 52 to the shift positions $P_{SH}$.

Among the shift positions $P_{SH}$ indicated by the "P" to "M" positions, the "P" position and the "M" position are the non-running positions selected when a vehicle is not caused to run and are the non-driving positions for selecting the switch-over to the power transmission interrupted state of the power transmission path by using the first clutch C1 and the second clutch C2, e.g., by releasing both the first clutch C1 and the second clutch C2 as indicated in the engagement operation table of FIG. 2, such that a vehicle with the power transmission path interrupted in the automatic shifting portion 20 cannot be driven. The "R" position, the "D" position, and the "M" position are the running positions selected when a vehicle is caused to run and are the driving positions for selecting the switch-over to the power transmittable state of the power transmission path by using the first clutch C1 and/or the second clutch C2, e.g., by engaging at least one of the first clutch C1 and the second clutch C2 as indicated in the engagement operation table of FIG. 2, such that a vehicle with the power transmission path coupled in the automatic shifting portion 20 can be driven.

Specifically, a manual operation of the shift lever 52 to the "R" position from the "P" position or the "N" position causes the engagement of the clutch C2, allowing the power transmission path in the automatic shifting portion 20 to go from the power transmission interrupted state to the power transmittable state, and a manful operation of the shift lever 52 to the "D" position from the "N" position causes the engagement of at least the clutch C1, allowing the power transmission path in the automatic shifting portion 20 to go from the power transmission interrupted state to the power transmittable state. A manual operation of the shift lever 52 to the "P" position or the "N" position from the "R" position causes the release of the clutch C2, allowing the power transmission path in the automatic shifting portion 20 to go from the power transmittable state to the power transmission interrupted state, and a manful operation of the shift lever 52 to the "N" position from the "D" position causes the release of the clutch C1 and the clutch C2, allowing the power transmission path in the automatic shifting portion 20 to go from the power transmittable state to the power transmission interrupted state.

Figure 6:
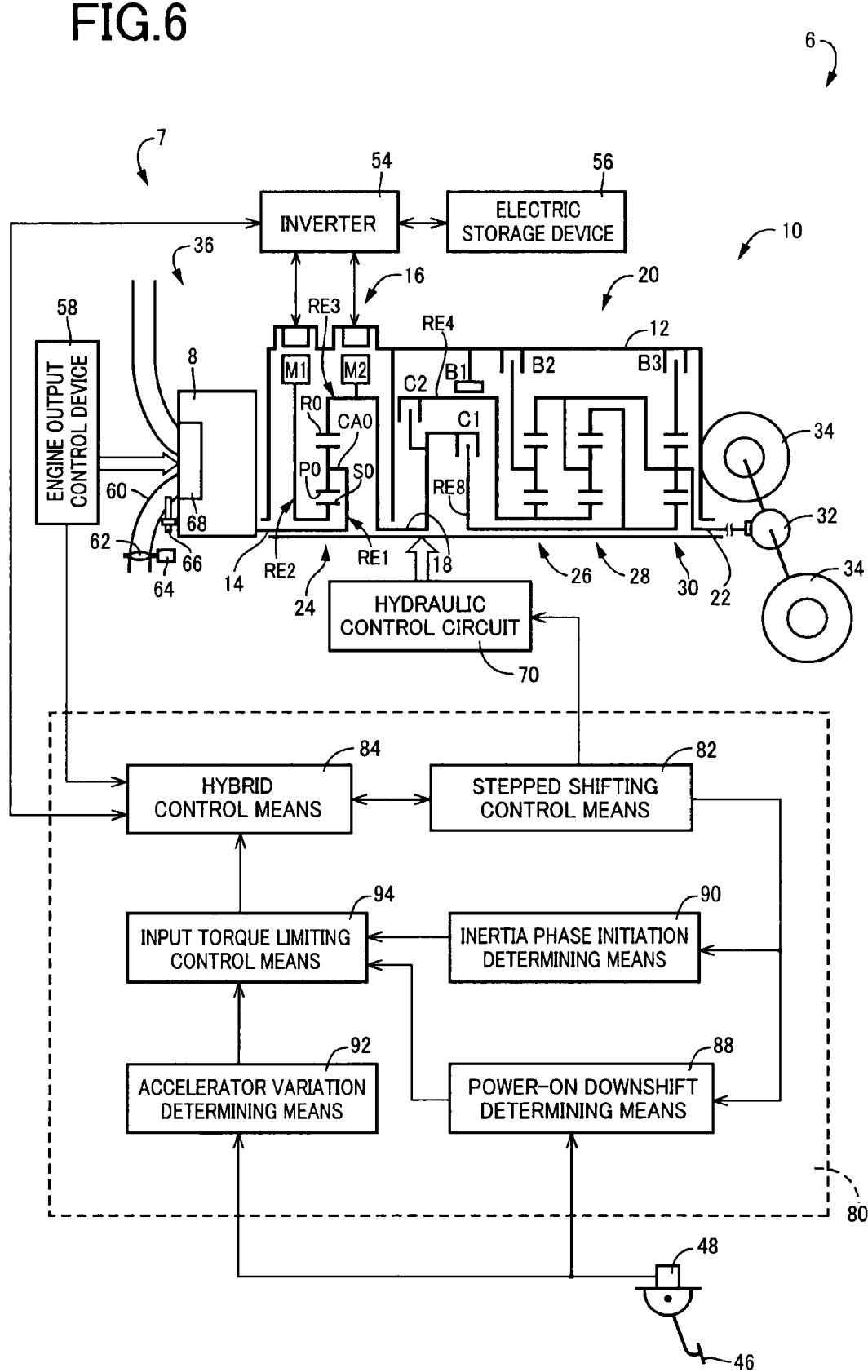
FIG. 6 is a functional block line diagram for explaining a main part of a control function of the electronic control device in FIG. 4.
Figure 7:
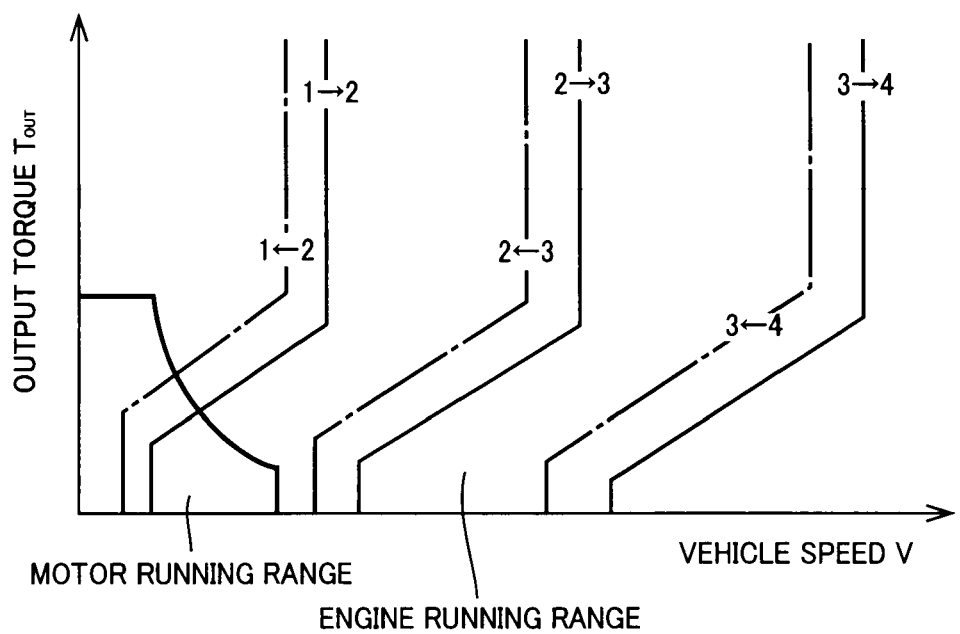
FIG. 7 illustrates an example of the drive power source switching line diagram that is previously stored and has the border between the engine running range and the motor running range for switching between the engine running and the motor running, and an example of the shifting line diagram that is previously stored and used for a basis for shifting determination of the automatic shifting portion, which are plotted in the single two-dimensional coordinate having parameters of the vehicle speed and the output torque in the vehicle drive device in FIG. 1.

FIG. 6 is a functional block line diagram for explaining a main part of a control function of the electronic control device 80. In FIG. 6, a stepped shifting control means 82 determines whether a shift of the automatic shifting portion 20 should be executed, i.e., determines a shift stage to be achieved by the shift of the automatic shifting portion 20 based on the vehicle state indicated by an actual vehicle speed V and a request output torque $T_{OUT}$ of the automatic shifting portion 20 in accordance with a relationship (a shifting line diagram, a shift map) having upshift lines (solid lines) and downshift lines (long dashed dotted lines) preliminarily stored using the vehicle speed V and the output torque $T_{OUT}$ of the automatic shifting portion 20 as parameters as depicted in FIG. 7, and performs the automatic transmission control of the automatic shifting portion 20 so as to acquire the determined shift stage.

In this case, the stepped shifting control means 82 gives to the hydraulic control circuit 70 a command (a shift output command, an oil pressure command) for engaging and/or releasing the hydraulic friction engagement devices involved in the shift of the automatic shifting portion 20, i.e., a command for executing the clutch-to-clutch shift by releasing the release-side engagement devices and by engaging the engagement-side engagement devices involved in the shift of the automatic shifting portion 20, such that the shift stage is achieved in accordance with, for example, the engagement operation table depicted in FIG. 2. In compliance with the command, the hydraulic control circuit 70 actuates the linear solenoid valve in the hydraulic control circuit 70 to activate the hydraulic actuator of the hydraulic friction engagement devices involved in the shift so that the shift of the automatic shifting portion 20 is executed as a result of the release of the release-side engagement devices and the engagement of the engagement-side engagement devices.

While operating the engine 8 in an efficient operation range, a hybrid control means 84 changes the drive power distribution between the engine 8 and the second electric motor M2 and the reaction force due to the electric generation by the first electric motor M1 to the optimum state to control the gear ratio γ0 of the differential portion 11 acting as an electric continuously variable transmission. For example, for a running vehicle speed V at a time point, a target (request) output of a vehicle is calculated from the accelerator opening degree Acc that is an output request amount of a driver and the vehicle speed V; a necessary total target output is calculated from the target output and a charge request value of the vehicle; and a target engine output is calculated such that the total target output is acquired in consideration of a transmission loss, an auxiliary loss, an assist torque of the second electric motor M2, etc., to control the engine 8 and control an electric generation amount of the first electric motor M1 so as to achieve the engine rotation speed $N_E$ and the engine torque $T_E$ for acquiring the target engine output.

For example, the hybrid control means 84 provides the control in consideration of the gear stages of the automatic shifting portion 20 for the purpose of improvements of power performance and fuel efficiency. In such hybrid control, the differential portion 11 is driven to function as an electric continuously variable transmission to match the engine rotation speed $N_E$ determined for operating the engine 8 in an efficient operation range with the rotation speed of the transmitting member 18 determined by the vehicle speed V and the shift stages of the automatic shifting portion 20. Therefore, the hybrid control means 84 stores in advance an optimal fuel consumption rate curve (fuel consumption map, relationship) that is one of operating curves of the engine 8 previously empirically obtained so as to satisfy both the drivability and the fuel consumption property during running with continuously variable transmission in the two-dimensional coordinates made up of the engine rotation speed $N_E$ and the output torque (engine torque) $T_E$ of the engine 8 and determines a target value of the total gear ratio γT of the power transmission device 10 such that the engine 8 is operated with operating points of the engine 8 (hereinafter, referred to as "engine operating points") lying along the optimal fuel consumption rate curve, for example, such that the engine torque $T_E$ and the engine rotation speed $N_E$ are achieved for generating the engine output necessary to satisfy the target output, and the hybrid control means 84 controls the gear ratio γ0 of the differential portion 11 in consideration of the gear stages of the automatic shifting portion 20 and controls the total gear ratio γ0 within the available variation range to acquire the target value. Here, the engine operating points refer to operating points indicative of the operation states of the engine 8 in the two-dimensional coordinates with its coordinate axes representing the amount of states indicative of the operation states of the engine 8 exemplified by the engine rotation speed $N_E$ and the engine torque $T_E$. In this embodiment, for example, the fuel consumption means a running distance per unit fuel consumption amount, etc., and the improvement of the fuel consumption means an increase of the running distance per unit fuel consumption amount, or means a decrease of the fuel consumption rate (=fuel consumption amount/drive wheel output) as the entire vehicle. On the contrary, the lowering of the fuel consumption means a decrease of the running distance per unit fuel consumption amount, or means an increase of the fuel consumption rate as the entire vehicle.

In this case, since the hybrid control means 84 supplies the electric energy generated by the first electric motor M1 to the electric storage device 56 and the second electric motor M2 via an inverter 54, a main part of the power of the engine 8 is mechanically transmitted to the transmitting member 18 while a part of the power of the engine 8 is consumed for the electric generation of the first electric motor M1 and converted into electric energy, and the electric energy is supplied through the inverter 54 to the second electric motor M2 to drive the second electric motor M2 and is transmitted from the second electric motor M2 to the transmitting member 18. The equipments related to the electric energy from the generation to the consumption by the second electric motor M2 make up an electric path from the conversion of a part of the power of the engine 8 into electric energy to the conversion of the electric energy into mechanical energy. The electric storage device 56 is an electric energy source capable of supplying/receiving the power to/from the first electric motor M1 and the second electric motor M2, i.e., an electric energy source capable of supplying the power to the electric motors M1 and M2 and of receiving the supply of the power from the electric motors M1 and M2, and it can be e.g., a battery such as a lead electric storage device or a capacitor.

The hybrid control means 84 controls the first electric motor rotation speed $N_{M1}$ and/or the second electric motor rotation speed $N_{M2}$ with the electric CVT function of the differential portion 11 such that the engine rotation speed $N_E$ is maintained substantially constant or rotationally controlled at an arbitrary rotation speed regardless of whether a vehicle is stopped or running. In other words, the hybrid control means 84 can rotationally control the first electric motor rotation speed $N_{M1}$ and/or the second electric motor rotation speed $N_{M2}$ at an arbitrary rotational speed while maintaining or controlling the engine rotation speed $N_E$ substantially constant or at an arbitrary rotation speed.

For example, as can be seen from the collinear diagram of FIG. 3, if the engine rotation speed $N_E$ is raised while a vehicle is running, the hybrid control means 84 raises the first electric motor rotation speed $N_{M1}$ while maintaining the second electric motor rotation speed $N_{M2}$ restricted by the vehicle speed V (the drive wheels 34) substantially constant. If the engine rotation speed $N_E$ is maintained substantially constant during a shift of the automatic shifting portion 20, the hybrid control means 84 changes the first electric motor rotation speed $N_{M1}$ in the direction opposite to the change in the second electric motor rotation speed $N_{M2}$ attendant on the shift of the automatic shifting portion 20 while maintaining the engine rotation speed $N_E$ substantially constant.

The hybrid control means 84 functionally includes an engine output control means that outputs commands separately or in combination to the engine output control device 58 to control opening/closing of the electronic throttle valve 62 with the throttle actuator 64 for throttle control, to control a fuel injection amount and an injection timing of the fuel injection device 66 for the fuel injection control, and to control the timing of the ignition by the ignition device 68 such as an igniter for the ignition timing control so as to execute the output control of the engine 8 to generate a necessary engine output.

For example, the hybrid control means 84 drives the throttle actuator 64 basically based on the accelerator opening degree Acc in accordance with a preliminarily stored relationship not shown to provide the throttle control such that the throttle valve opening degree $\theta_{TH}$ is increased as the accelerator opening degree Acc increases. The engine output control device 58 controls the engine torque by controlling opening/closing of the electronic throttle valve 62 with the throttle actuator 64 for the throttle control, controlling the fuel injection by the fuel injection device 66 for the fuel injection control, and controlling the timing of the ignition by the ignition device 68 such as an igniter for the ignition timing control in accordance with the commands from the hybrid control means 84.

The hybrid control means 84 can achieve the motor running using the second electric motor M2 as the running drive power source with the electric CVT function (differential action) of the differential portion 11 regardless of whether the engine 8 is stopped or in the idle state. For example, the hybrid control means 84 performs the motor running in a relatively lower output torque $T_{OUT}$ zone, i.e., a lower engine torque $T_E$ zone generally considered as having poor engine efficiency as compared to a higher torque zone, or in a relatively lower vehicle speed zone of the vehicle speed V, i.e., a lower load zone. During the motor running, to suppress the drag of the stopped engine 8 and improve the fuel consumption, the hybrid control means 84 controls the first electric motor rotation speed $N_{M1}$ at a negative rotation speed to put the first electric motor M1 into the no-load state for idling for example to thereby maintain the engine rotation speed $N_E$ at zero or substantially zero as needed with the electric CVT function (differential action) of the differential portion 11.

The hybrid control means 84 can provide a so-called torque assist for complementing the power of the engine 8, even in the engine running range where the engine running is performed using the engine 8 as the running drive power source, by supplying the electric energy from the first electric motor M1 and/or the electric energy from the electric storage device 56 through the electric path described above to the second electric motor M2 and by driving the second electric motor M2 to apply a torque to the drive wheels. Thus, the engine running of this embodiment can include a case of using the engine 8 as a running drive power source and a case of using both the engine 8 and the second electric motor M2 as the running drive power source. The motor running of this embodiment means a running using the second electric motor M2 as the running drive power source with the engine 8 stopped.

The hybrid control means 84 can put the first electric motor M1 into the no-load state so that the first electric motor M1 is allowed to freely rotate, i.e., idle, to thereby put the differential portion 11 into the state unable to transmit a torque, i.e., the state equivalent to the state with the power transmission path interrupted in the differential portion 11 and the state in which the output from the differential portion 11 is not generated. Therefore, the hybrid control means 84 can put the first electric motor M1 into the no-load state to thereby put the differential portion 11 into the neutral state (neutral state) that electrically interrupts the power transmission path.

During the inertia running (during coasting) when the acceleration is turned off and during braking by the foot brake, the hybrid control means 84 functions, to improve the fuel consumption, as a regenerative control means that rotationally drives the second electric motor M2 to operate as an electric generator by the kinetic energy of the vehicle, i.e., a reverse drive force transmitted from the drive wheels 34 toward the engine 8, to charge the electric storage device 56 via the inverter 54 with the electric energy, i.e., a current generated by the second electric motor. This regenerative control is provided such that a regenerative amount is determined based on e.g., the charge remaining amount SOC of the electric storage device 56 and the braking force distribution of a braking force from a hydraulic brake for acquiring a braking force corresponding to a brake pedal operation amount.

While the electronic control device 80 includes the stepped shifting control means 82 and the hybrid control means 84 that provide the control as described above, the electronic control device 80 also includes a power-on downshift determining means 88, an inertia phase initiation determining means 90, an accelerator variation determining means 92, and an input torque limiting control means 94 so as to improve the drivability during a power-on downshift, which is a downshift of the automatic shifting portion 20 executed during an accelerator depressing operation.

The power-on downshift determining means 88 determines whether a downshift of the automatic shifting portion 20 is executed during an accelerator depressing operation, i.e., whether a power-on downshift is executed. For example, if the accelerator pedal 46 is depressed and an accelerator opening degree Acc, i.e., an accelerator operation amount is not zero, the power-on downshift determining means 88 determines that the accelerator depressing operation is being performed and, if the stepped shifting control means 82 makes a shifting determination that a downshift of the automatic shifting portion 20 should be executed based on a vehicle state from the shifting line diagram (see FIG. 7) during the accelerator depressing operation, the power-on downshift determining means 88 determines that a power-on downshift is executed. The power-on downshift determining means 88 determines whether the power-on downshift is executed before the stepped shifting control means 82 issues a shifting output that commands the hydraulic control circuit 70 to execute the downshift based on the shifting determination.

The inertia phase initiation determining means 90 determines whether the inertia phase of the downshift is initiated in the downshift of the automatic shifting portion 20 started by the shifting output. Whether the inertia phase is initiated can be detected from a rotation speed $N_{M2}$ of the second electric motor M2 coupled to the transmitting member 18 that is the input rotating member of the automatic shifting portion 20, for example. If the inertia phase is not initiated, the inertia phase initiation determining means 90 determines that the inertial phase is before initiation.

The accelerator variation determining means 92 determines whether a change in the accelerator opening degree Acc, i.e., an accelerator variation $VR_{ACC}$ is equal to or less than a predetermined accelerator variation limit $L1_{ACC}$. The accelerator variation determining means 92 makes this determination for the accelerator variation $VR_{ACC}$ before the start of the downshift, for example, the accelerator variation $VR_{ACC}$ before the shifting output. The case of the accelerator variation $VR_{ACC}$ equal to or less than the accelerator variation limit $L1_{ACC}$ is referred to as a slow depression of the accelerator pedal 46 and the case of the accelerator variation $VR_{ACC}$ greater than the accelerator variation limit $L1_{ACC}$ is referred to as a quick depression of the accelerator pedal 46.

The accelerator variation $VR_{ACC}$ specifically corresponds to the accelerator opening degree Acc that is an accelerator operation amount or an accelerator operation speed $SA_{CC}$ that is an increment of the accelerator operation amount Acc per unit time and either may be applicable. Therefore, if the accelerator variation $VR_{ACC}$ corresponds to the accelerator operation amount Acc, the accelerator variation determining means 92 determines whether the accelerator operation amount Acc is equal to or less than a predetermined accelerator operation amount determination value $LQ_{ACC}$ corresponding to the accelerator variation limit $L1_{ACC}$ and, as a result, if the accelerator operation amount Acc is equal to or less than the accelerator operation amount determination value $LQ_{ACC}$, the accelerator variation determining means 92 determines that the accelerator variation $VR_{ACC}$ is equal to or less than the accelerator variation limit $L1_{ACC}$. If the accelerator variation $VR_{ACC}$ corresponds to the accelerator operation speed $SA_{CC}$, the accelerator variation determining means 92 determines whether the accelerator operation speed $SA_{CC}$ is equal to or less than a predetermined accelerator operation speed determination value $LS_{ACC}$ corresponding to the accelerator variation limit $L1_{ACC}$ and, as a result, if the accelerator operation speed $SA_{CC}$ is equal to or less than the accelerator operation speed determination value $LS_{ACC}$, the accelerator variation determining means 92 determines that the accelerator variation $VR_{ACC}$ is equal to or less than the accelerator variation limit $L1_{ACC}$. The accelerator operation amount determination value $LQ_{ACC}$ is a determination value set in terms of the accelerator operation amount Acc and stored in the accelerator variation determining means 92 and is a determination value empirically defined in advance so as to determine that the engine torque $T_E$ rises following an accelerator pedal operation substantially without delay if the accelerator operation amount Acc is equal to or less than the determination value. The accelerator operation speed determination value $LS_{ACC}$ is a determination value set in terms of the accelerator operation speed SAcc and stored in the accelerator variation determining means 92 and is a determination value empirically defined in advance so as to determine that the engine torque $T_E$ rises following an accelerator pedal operation substantially without delay if the accelerator operation speed SAcc is equal to or less than the determination value.

The accelerator variation determining means 92 may make determinations for both the accelerator operation amount Acc and the accelerator operation speed $SA_{CC}$ corresponding to the accelerator variation $VR_{ACC}$. For example, in such a case, the accelerator variation determining means 92 determines that the accelerator variation $VR_{ACC}$ is equal to or less than the accelerator variation limit $L1_{ACC}$ if the accelerator operation amount Acc is equal to or less than the accelerator operation amount determination value $LQ_{ACC}$ and the accelerator operation speed $SA_{CC}$ is equal to or less than the accelerator operation speed determination value $LS_{ACC}$.

The accelerator variation determining means 92 may determine the slow depression or the quick depression of the accelerator pedal 46 based on the output torque $T_{OUT}$ of the automatic shifting portion 20 (the output torque $T_{OUT}$ of the drive device 7), etc. This is because the correlative relationship exists such that the followability of the output torque $T_{OUT}$ of the automatic shifting portion 20 to the accelerator pedal operation is favorable in the case of the slow depression of the accelerator pedal 46 and is deteriorated in the case of the quick depression of the accelerator pedal 46 since the output torque $T_{OUT}$ of the automatic shifting portion 20 changes depending on the engine torque $T_E$.

Specifically describing a case that the accelerator variation determining means 92 uses the output torque $T_{OUT}$ of the automatic shifting portion 20 as a parameter for determination, the accelerator variation determining means 92 determines whether the output torque $T_{OUT}$ of the automatic shifting portion 20 at the time of the shifting output of the stepped shifting control means 82 commanding the execution of the downshift is equal to or greater than a predetermined output torque determination value $LT_{OUT}$, for example. As a result, if the output torque $T_{OUT}$ of the automatic shifting portion 20 at the time of the shifting output is equal to or greater than the output torque determination value $LT_{OUT}$, the accelerator variation determining means 92 determines that the accelerator variation $VR_{ACC}$ before the start of the downshift is equal to or less than the accelerator variation limit $L1_{ACC}$. In contrast, if the output torque $T_{OUT}$ of the automatic shifting portion 20 at the time of the shifting output is less than the output torque determination value $LT_{OUT}$, the accelerator variation determining means 92 determines that the accelerator variation $VR_{ACC}$ before the start of the downshift is greater than the accelerator variation limit $L1_{ACC}$. Given this situation, it can be said that the accelerator variation determining means 92 making a determination on the output torque $T_{OUT}$ of the automatic shifting portion 20 acts as an output torque determining means. The output torque $T_{OUT}$ of the automatic shifting portion 20 can be calculated based on an output torque $T_{M1}$ of the first electric motor M1 (hereinafter, a "first electric motor torque $T_{M1}$") determined depending on the control current value of the first electric motor M1, an output torque $T_{M2}$ of the second electric motor M2 (hereinafter, a "second electric motor torque $T_{M2}$") determined depending on the control current value of the second electric motor M2, and the current shift stage of the automatic shifting portion 20, for example. The output torque determination value $LT_{OUT}$ is a determination value stored in the accelerator variation determining means 92 and is a determination value empirically defined in advance so as to determine that the output torque $T_{OUT}$ rises following an accelerator pedal operation substantially without delay if the output torque $T_{OUT}$ of the automatic shifting portion 20 at the time of the shifting output is equal to or greater than the determination value. The output torque determination value $LT_{OUT}$ is changed depending on the accelerator opening degree Acc at the time of the shifting output and the shift stage of the automatic shifting portion 20 or the like before the downshift due to the shifting output. For example, the output torque determination value $LT_{OUT}$ is increased when the accelerator opening degree Acc at the time of the shifting output is larger, and is decreased when the shift stage of the automatic shifting portion 20 before the downshift corresponds to a higher vehicle speed. Although the accelerator variation determining means 92 makes a determination on the output torque $T_{OUT}$ of the automatic shifting portion 20 at the time of the shifting output as described above, the determination may be made on the assumption that the output torque $T_{OUT}$ of the automatic shifting portion 20 a very short time before the time of the shifting output is the output torque at the time of the shifting output, in consideration of the processing time for making the determination. Since the shifting determination is made before the shifting output, the time of the shifting output can be predicted from the time of the shifting determination.

If the power-on downshift determining means 88 determines that the power-on downshift is executed, the input torque limiting control means 94 provides the input torque limiting control to limit an input torque $T_{ATIN}$ (hereinafter, "AT input torque $T_{ATIN}$") to the automatic shifting portion 20 before the initiation of the inertia phase in the downshift of the automatic shifting portion 20 as compared to the case of not executing the downshift. The case of not executing the downshift is, for example, the case of not executing a shift of the automatic shifting portion 20 or the case of executing an upshift of the automatic shifting portion 20. In the provision of the input torque limiting control, whether the inertial phase in the downshift is before initiation is determined based on the determination by the inertia phase initiation determining means 90. In other words, the input torque limiting control means 94 limits the AT input torque $T_{ATIN}$ while the inertia phase initiation determining means 90 determines that the inertial phase in the downshift is before initiation in the input torque limiting control. The input torque limiting control means 94 also provides the input torque limiting control if the power-on downshift is executed during the engine running, for example.

Although the AT input torque $T_{ATIN}$ may be limited by limiting either the engine torque $T_E$ or the second electric motor torque $T_{M2}$, the input torque limiting control means 94 does not limit the engine torque $T_E$ to cause the engine torque $T_E$ to work as in the case that the input torque limiting control is not provided, and provides the input torque limiting control solely by the output torque limitation of the second electric motor so as to recover the AT input torque $T_{ATIN}$ in a responsive manner after the cancelation of the input torque limiting control.

Since the followability of the engine torque $T_E$ to the accelerator pedal operation varies depending on whether the accelerator pedal 46 is slowly depressed or quickly depressed, the input torque limiting control means 94 of this embodiment switches an upper limit value $ULT_{ATIN}$ of the AT input torque $T_{ATIN}$ in the input torque limiting control depending on the accelerator variation $VR_{ACC}$ so as to improve the initial response when the input torque limiting control is provided. Specifically, in the input torque limiting control, the input torque limiting control means 94 limits the AT input torque $T_{ATIN}$ before the initiation of the inertia phase in the downshift to the AT input torque $T_{ATIN}$ at the time of the shifting output commanding the execution of the downshift if the accelerator variation determining means 92 determines that the accelerator variation $VR_{ACC}$ is equal to or less than the accelerator variation limit $L1_{ACC}$. In other words, the input torque limiting control means 94 sets the AT input torque $T_{ATIN}$ at the time of the shifting output as the upper limit value $ULT_{ATIN}$ of the AT input torque $T_{ATIN}$ before the initiation of the inertia phase. In contrast, if the accelerator variation determining means 92 determines that the accelerator variation $VR_{ACC}$ is greater than the accelerator variation limit $L1_{ACC}$, the input torque limiting control means 94 limits the AT input torque $T_{ATIN}$ before the initiation of the inertia phase in the downshift equal to or less than a predetermined input torque limit value $LT_{IN}$ greater than the AT input torque $T_{ATIN}$ at the time of the shifting output. In other words, the input torque limiting control means 94 sets the input torque limit value $LT_{IN}$ as the upper limit value $ULT_{ATIN}$ of the AT input torque $T_{ATIN}$ before the initiation of the inertia phase. The input torque limit value $LT_{IN}$ is relatively determined by the input torque limiting control means 94 based on the AT input torque $T_{ATIN}$ at the time of the shifting output, and an increment of the input torque limit value $LT_{IN}$ relative to the AT input torque $T_{ATIN}$ at the time of the shifting output is empirically defined such that the initial response to the accelerator operation is ensured while a driver feels no two-stage acceleration shock during the power-on downshift.

In some cases, a charging power limitation may occur and limit a charging power $W_{IN}$ to the electric storage device 56 disposed on the vehicle 6 of this embodiment lower than a predetermined allowable charging power $LW_{IN}$, and a discharging power limitation may occur and limit a discharging power $W_{OUT}$ of the electric storage device 56 lower than a predetermined allowable discharging power $LW_{OUT}$. For example, the charging power limitation and the discharging power limitation may occur in such a case when the electric storage device 56 is at an extremely-low temperature. The charging power limitation occurs when a charge remaining amount SOC of the electric storage device 56 reaches closer to the upper limit value thereof and the discharging power limitation occurs when the charge remaining amount SOC reaches closer to the lower limit value thereof. The allowable charging power $LW_{IN}$ and the allowable discharging power $LW_{OUT}$ are allowable values set so as to maintain the durability of the electric storage device 56 to the charging power $W_{IN}$ and the discharging power $W_{OUT}$, respectively.

Although the input torque limiting control means 94 provides the input torque limiting control by the output torque limitation of the second electric motor M2 as described above, the power transmission device 10 of this embodiment includes the two electric motors M1 and M2 and, therefore, if the input torque limiting control is provided while the charging power limitation or the discharging power limitation occurs, the input torque limiting control means 94 may select the electric motor subjected to the output torque limitation from the first electric motor M1 and the second electric motor M2. Describing the selection of the electric motors M1 and M2 while the charging power limitation occurs and does not occur, for example, when providing the input torque limiting control, the input torque limiting control means 94 calculates an electric power balance of the electric storage device 56 for each of the cases of providing the input torque limiting control by the output torque limitation of the first electric motor M1 and providing the input torque limiting control by the output torque limitation of the second electric motor M2 before providing the input torque limiting control, based on the first electric motor rotation speed $N_{M1}$, the second electric motor rotation speed $N_{M2}$, the engine torque $T_E$, and the upper limit value $ULT_{ATIN}$ of the AT input torque $T_{ATIN}$ and the like before the initiation of the inertia phase. Subsequently, the input torque limiting control means 94 provides the input torque limiting control by the output torque limitation of the first electric motor M1 or the second electric motor M2 associated with the electric power balance of the electric storage device 56 toward the discharging side during the charging power limitation while providing the input torque limiting control by the output torque limitation of the first electric motor M1 or the second electric motor M2 associated with the electric power balance of the electric storage device 56 toward the charging side if not during the charging power limitation. If the input torque limiting control is provided by the output torque limitation of the first electric motor M1, the engine torque $T_E$ is allowed to be limited in accordance with the output torque limitation of the first electric motor M1; however, it is desirable that the engine torque $T_E$ in this case is not limited when possible. For example, when calculating the electric power balance of the electric storage device 56, the input torque limiting control means 94 predicts the AT input torque $T_{ATIN}$ etc., at the time of the shifting output from the actual vehicle state before the shifting output to calculate the electric power balance.

Describing the selection of the electric motors M1 and M2 while the charging power limitation and the discharging power limitation occur, for example, when providing the input torque limiting control, the input torque limiting control means 94 calculates the operation rate of the first electric motor M1 and the second electric motor M2 in the input torque limiting control that achieves the electric power balance of the electric storage device 56 closest to zero before providing the input torque limiting control based on the first electric motor rotation speed $N_{M1}$, the second electric motor rotation speed $N_{M2}$, the engine torque $T_E$, and the upper limit value $ULT_{ATIN}$ of the AT input torque $T_{ATIN}$ and the like before the initiation of the inertia phase on the assumption that the input torque limiting control is provided by the output torque limitation of both the first electric motor M1 and the second electric motor M2. Subsequently, during both the charging power limitation and the discharging power limitation, the input torque limiting control means 94 provides the input torque limiting control by the output torque limitation of the first electric motor M1 and the second electric motor M2 such that the first electric motor M1 and the second electric motor M2 are operated at the calculated operation rate. In this case, preferably, the input torque limiting control is provided by the output torque limitation of the first electric motor M1 and the second electric motor M2 on the condition that one of the first electric motor M1 and the second electric motor M2 generates electric power while the other consumes electric power.

Figure 8:
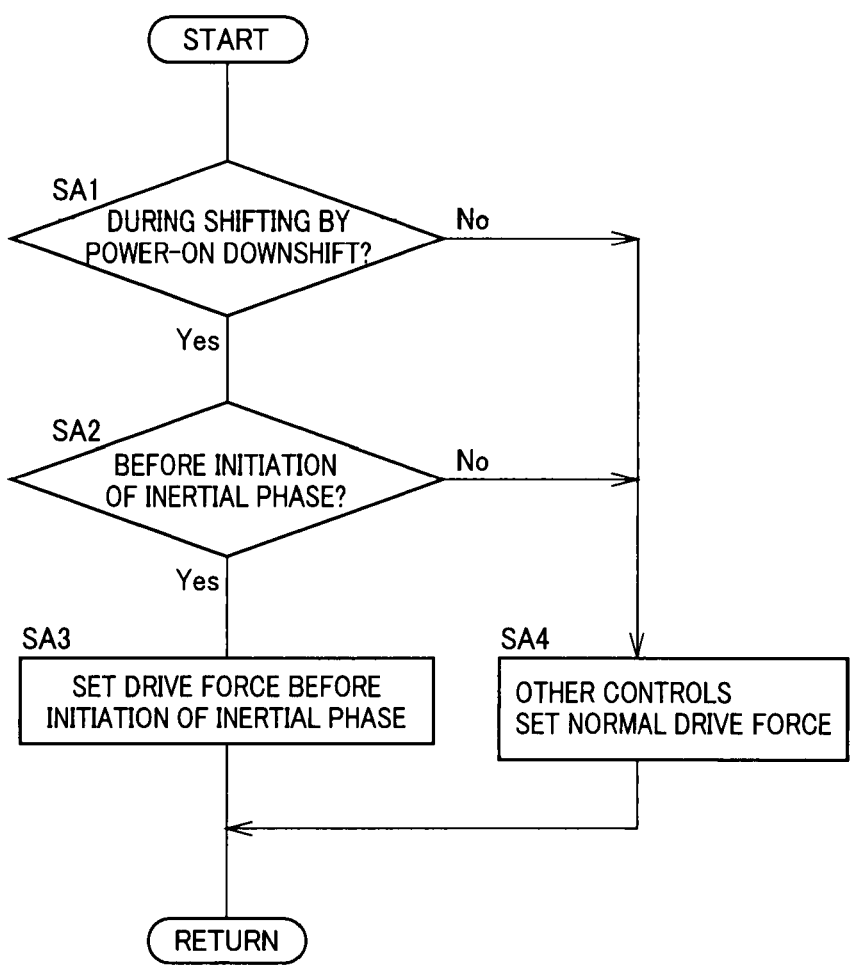
FIG. 8 is a flowchart for explaining a main portion of the control operation of the electronic control device.

FIG. 8 is a flowchart for explaining a main portion of the control operation of the electronic control device 80, i.e., the control operation of providing the input torque limiting control, which is repeatedly executed with an extremely short cycle time, for example, on the order of few msec to a few tens of msec. The flowchart of FIG. 8 is preferably executed in the case of the engine running of the vehicle 6.

First, at step (hereinafter, "step" is omitted) SA1 corresponding to the power-on downshift determining means 88, it is determined whether a downshift of the automatic shifting portion 20 is executed during an accelerator depressing operation, i.e., whether the power-on downshift is executed. If the determination at SA1 is affirmative, i.e., if the power-on downshift is executed, the operation goes to SA2. In contrast, if the determination at SA1 is negative, the operation goes to SA4.

At SA2 corresponding to the inertia phase initiation determining means 90, it is determined whether the inertia phase of the power-on downshift is before initiation. If the determination at SA2 is affirmative, i.e., if the inertia phase is before initiation, the operation goes to SA3. In contrast, if the determination at SA2 is negative, the operation goes to SA4.

At SA3 corresponding to the input torque limiting control means 94, the input torque limiting control is provided. In other words, it can be said that the drive force before the initiation of the inertia phase is set depending on the upper limit value $ULT_{ATIN}$ of the AT input torque $T_{ATIN}$ before the initiation of the inertial phase set in the input torque limiting control.

At SA4 corresponding to the input torque limiting control means 94, other controls are provided. At SA4, the input torque limiting control is not provided and it can be said that the drive force is set as usual.

Figure 9:
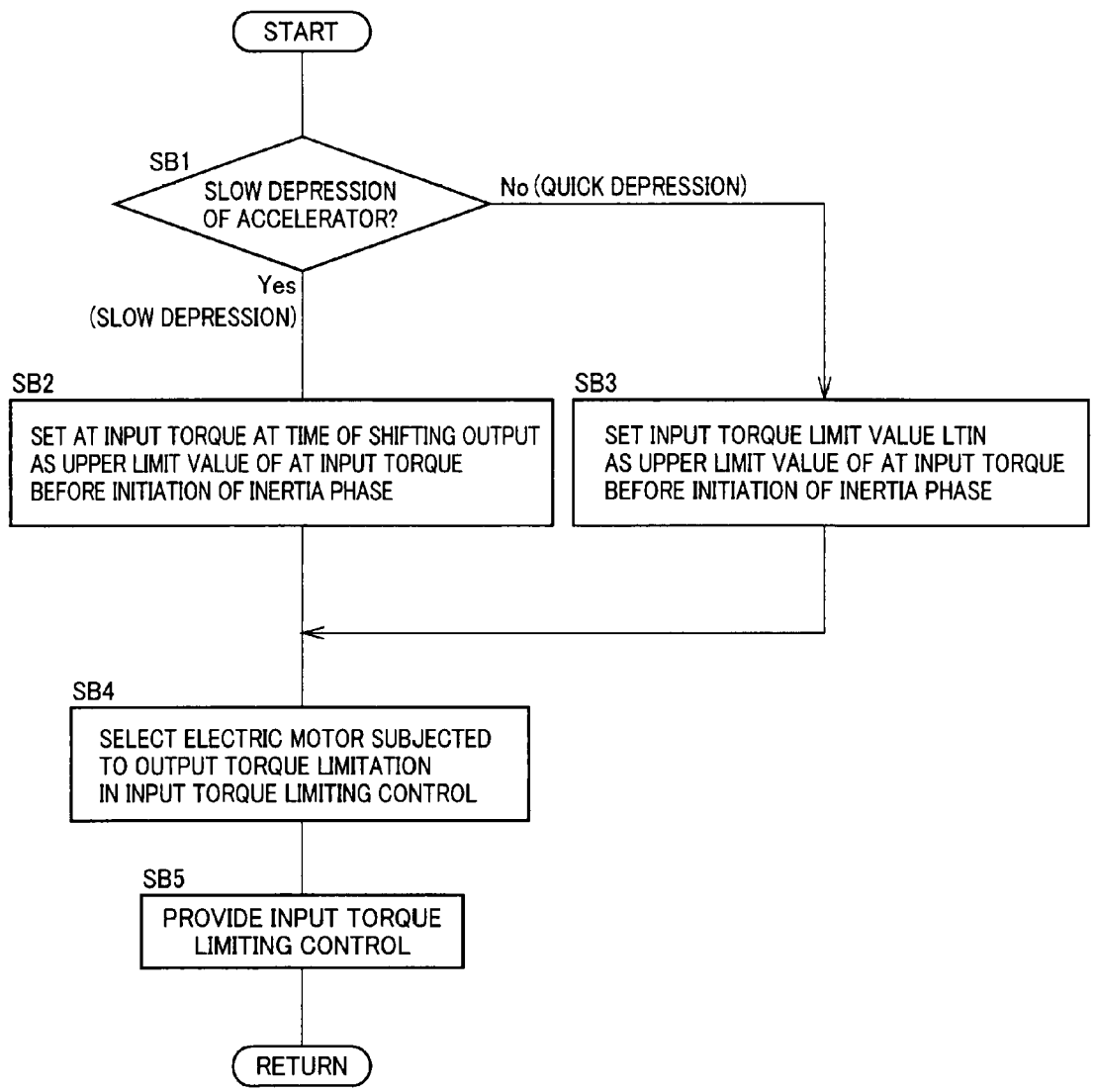
FIG. 9 is a flowchart for explaining a main portion of the control operation at step SA3 of FIG. 8.

FIG. 9 is a flowchart for explaining a main portion of the control operation at SA3 of FIG. 8. In other words, specifically, the flowchart of FIG. 9 is executed at SA3.

At SB1 corresponding to the accelerator variation determining means 92, it is determined whether the accelerator variation $VR_{ACC}$ before the start of the power-on downshift is equal to or less than the accelerator variation limit $L1_{ACC}$, i.e., whether the accelerator variation $VR_{ACC}$ indicates the slow depression of the accelerator pedal 46. If the determination at SB1 is affirmative, i.e., the accelerator variation $VR_{ACC}$ indicates the slow depression of the accelerator pedal 46, the operation goes to SB2. In contrast, if the determination at SB1 is negative, i.e., the accelerator variation $VR_{ACC}$ indicates the quick depression of the accelerator pedal 46, the operation goes to SB3.

The accelerator variation $VR_{ACC}$ corresponds to the accelerator operation amount Acc or the accelerator operation speed $SA_{CC}$, for example. Assuming that the accelerator variation $VR_{ACC}$ corresponds to the accelerator operation amount Acc at SB1, if the accelerator operation amount Acc before the start of the power-on downshift is equal to or less than the accelerator operation amount determination value $LQ_{ACC}$, it is determined that the accelerator variation $VR_{ACC}$ before the start of the power-on downshift is equal to or less than the accelerator variation limit $L1_{ACC}$. Assuming that the accelerator variation $VR_{ACC}$ corresponds to the accelerator operation speed $SA_{CC}$ at SB1, if the accelerator operation speed $SA_{CC}$ before the start of the power-on downshift is equal to or less than the accelerator operation speed determination value $LS_{ACC}$, it is determined that the accelerator variation $VR_{ACC}$ before the start of the power-on downshift is equal to or less than the accelerator variation limit $L1_{ACC}$.

The determination at SB1 may be made by using the output torque $T_{OUT}$ of the automatic shifting portion 20 as a parameter without directly making the determination on the accelerator variation $VR_{ACC}$ at SB1. For example, if it is determined whether the output torque $T_{OUT}$ of the automatic shifting portion 20 at the time of the shifting output commanding the execution of the downshift is equal to or greater than the output torque determination value $LT_{OUT}$ and, as a result, if the output torque $T_{OUT}$ of the automatic shifting portion 20 at the time of the shifting output is equal to or greater than the output torque determination value $LT_{OUT}$, it is determined that the accelerator variation $VR_{ACC}$ before the start of the power-on downshift is equal to or less than the accelerator variation limit $L1_{ACC}$.

At SB2, the AT input torque $T_{ATIN}$ at the time of the shifting output is set as the upper limit value $ULT_{ATIN}$ of the AT input torque $T_{ATIN}$ before the initiation of the inertial phase in the input torque limiting control. The operation goes to SB4 after SB2.

At SB3, the input torque limit value $LT_{IN}$ is set as the upper limit value $ULT_{ATIN}$ of the AT input torque $T_{ATIN}$ before the initiation of the inertial phase in the input torque limiting control. The operation goes to SB4 after SB3.

At SB4, the electric motor subjected to the output torque limitation in the input torque limiting control is selected from the first electric motor M1 and the second electric motor M2 based on whether the charging power limitation or the discharging power limitation occurs. Specifically, during the charging power limitation, the first electric motor M1 or the second electric motor M2 associated with the electric power balance of the electric storage device 56 toward the discharging side is selected while the first electric motor M1 or the second electric motor M2 associated with the electric power balance of the electric storage device 56 toward the charging side is selected if not during the charging power limitation. During both the charging power limitation and the discharging power limitation, both the first electric motor M1 and the second electric motor M2 are selected. The operation goes to SB5 after SB4.

At SB5, the upper limit value $ULT_{ATIN}$ of the AT input torque $T_{ATIN}$ set at SB2 or SB3 is used for providing the input torque limiting control through the output torque limitation of one or both of the first electric motor M1 and the second electric motor M2 selected at SB4. SB2 to SB5 correspond to the torque limiting control means 94.

Figure 10:
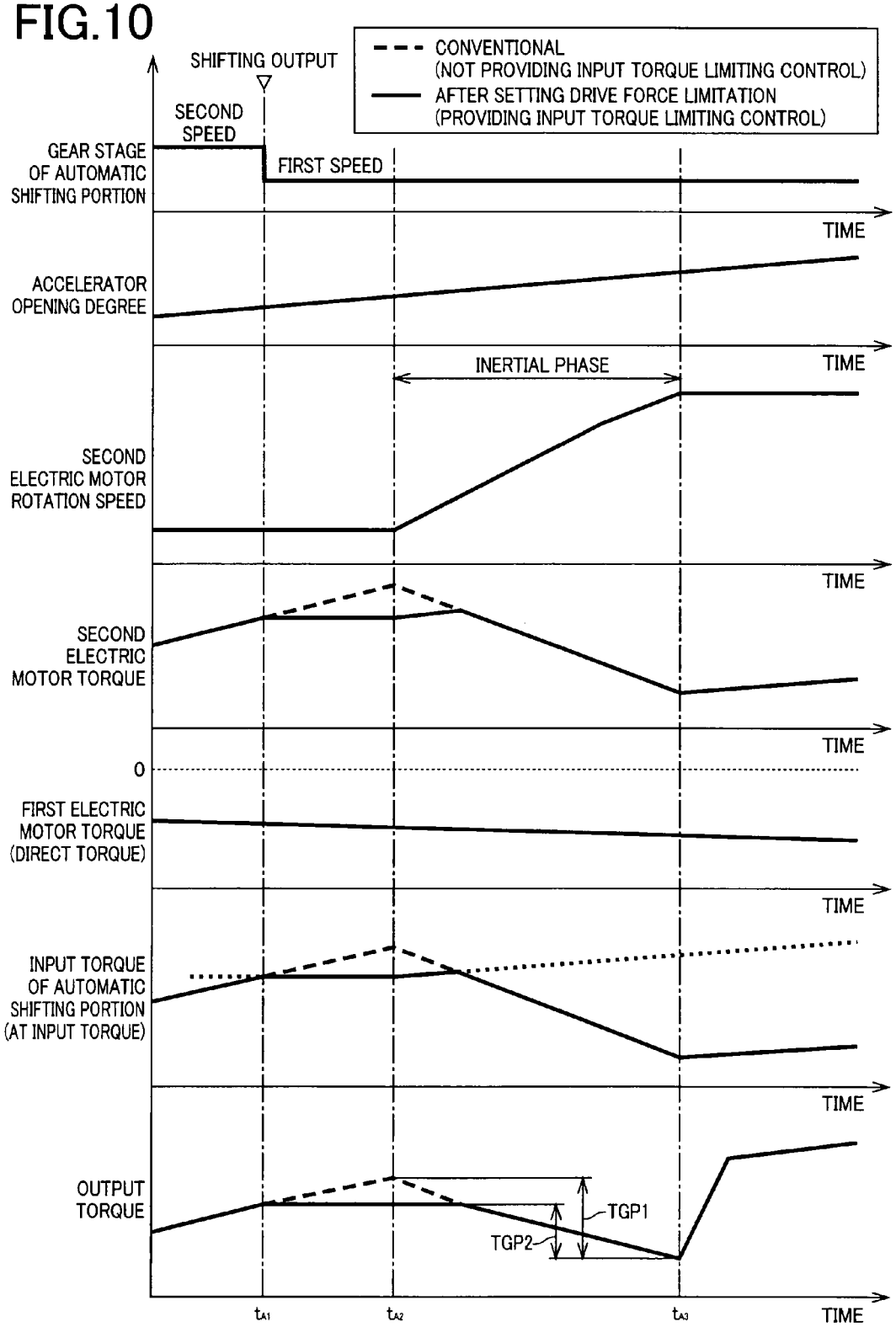
FIG. 10 is a time chart for explaining the input torque limiting control at the time of the slow depression of the accelerator pedal, taking the power-on downshift from the second speed to the first speed of the automatic shifting portion during the engine running as an example in the vehicle drive device in FIG. 1.
Figure 11:
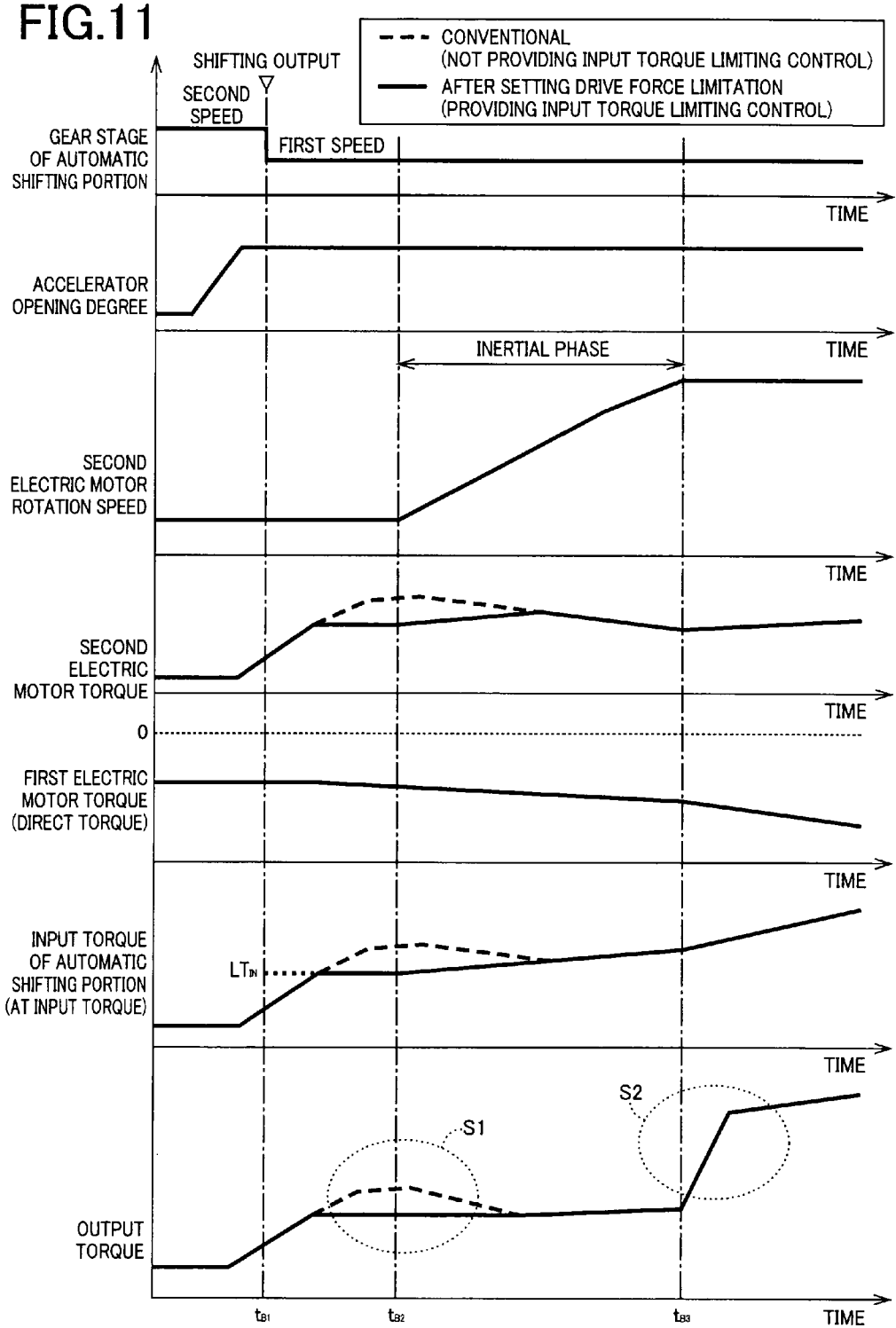
FIG. 11 is a time chart for explaining the input torque limiting control at the time of the quick depression of the accelerator pedal, taking the power-on downshift from the second speed to the first speed of the automatic shifting portion during the engine running as an example in the vehicle drive device in FIG. 1.
Figure 12:
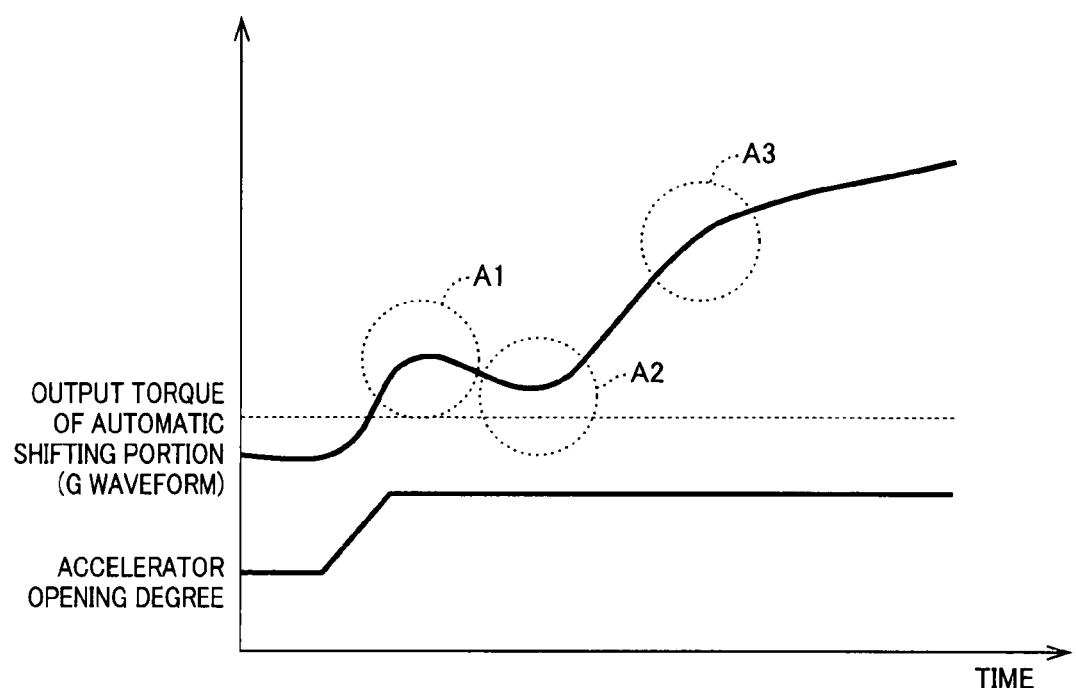
FIG. 12 is a time chart for explaining that two-stage acceleration shocks occur at the time of a conventional power-on downshift.

FIG. 10 is a time chart for explaining the input torque limiting control at the time of the slow depression of the accelerator pedal 46, taking the power-on downshift from the second speed to the first speed of the automatic shifting portion 20 during the engine running as an example. FIG. 11 is a time chart for explaining the input torque limiting control at the time of the quick depression of the accelerator pedal 46, taking the power-on downshift from the second speed to the first speed of the automatic shifting portion 20 during the engine running as an example. The input torque limiting control of FIGS. 10 and 11 is provided by the output torque limitation of the second electric motor M2. In FIGS. 10 and 11, a solid line indicates a time chart when the input torque limiting control is provided, and time charts of the second electric motor torque $T_{M2}$, the AT input torque $T_{ATIN}$, and the output torque $T_{OUT}$ of the drive device 7, i.e., the output torque $T_{OUT}$ of the automatic shifting portion 20 indicated by broken lines represent time charts during a conventional power-on down shift without the input torque limiting control. A fine dotted line in the time chart of the AT input torque $T_{ATIN}$ of FIGS. 10 and 11 indicates the upper limit value $ULT_{ATIN}$ of the AT input torque $T_{ATIN}$ set in the input torque limiting control. In FIGS. 10 and 11, "direct torque" in parentheses in the time chart of the first electric motor torque $T_{M1}$ is additionally described in the time chart of the first electric motor torque $T_{M1}$ since an engine direct torque (direct torque) $T_{ED}$ mechanically transmitted from the engine 8 to the transmitting member 18 is expressed by the following equation (1) and is in one-on-one relationship with the first electric motor torque $T_{M1}$. However, as can be seen from the following equation (1), the positive and negative of the engine direct torque $T_{ED}$ and the first electric motor torque $T_{M1}$ are opposite to each other. In the following equation (1), "$\rho 0$" denotes a gear ratio of the differential potion planetary gear device 24 and "$T_E$" denotes an engine torque.

$$T_{ED}=T_E/(1+\rho 0)=(-T_{M1})/\rho 0 \tag{1}$$

Time $t_{A1}$ and time $t_{B1}$ of FIGS. 10 and 11 indicate the time of the shifting output causing the downshift of the automatic shifting portion 20 from the second speed to the first speed; time $t_{A2}$ and time $t_{B2}$ indicate the initiation of the inertia phase in the downshift; and time $t_{A3}$ and time $t_{B3}$ indicate the end of the inertial phase in the downshift, i.e., the end of the downshift.

Before time $t_{A1}$ of FIG. 10, the shifting determination is made to indicate that the downshift of the automatic shifting portion 20 should be executed. Since the accelerator depressing operation is already performed, the determination at SA1 of FIG. 8 is affirmed. Since the inertial phase is before initiation (at time $t_{A2}$), the determination at SA2 of FIG. 8 is affirmed.

As can be seen from the time chart of the accelerator opening degree Acc before time $t_{A1}$ of FIG. 10, this is the slow depression of the accelerator pedal 46 and, as a result, the AT input torque $T_{ATIN}$ at the time of the shifting output is set as the upper limit value $ULT_{ATIN}$ of the AT input torque $T_{ATIN}$ at SB2 of FIG. 9. Therefore, as indicated by the solid line in the time chart of the AT input torque $T_{ATIN}$ of FIG. 10, the input torque limiting control is provided to limit the AT input torque $T_{ATIN}$ before the initiation of the inertial phase, i.e., the AT input torque $T_{ATIN}$ from the time of the shifting output (time $t_{A1}$) to the initiation of the inertial phase (time $t_{A2}$) to the AT input torque $T_{ATIN}$ at the time of the shifting output (the upper limit value $ULT_{ATIN}$). In the early period after the initiation of the inertia phase, the AT input torque $T_{ATIN}$ is smoothly returned from time $t_{A2}$ to the torque when the input torque limiting control is not provided, without generating a torque level difference. As depicted in the time chart of the second electric motor torque $T_{M2}$ of FIG. 10, the AT input torque $T_{ATIN}$ is limited solely by the output torque limitation of the second electric motor M2 relative to a torque variation (broken line) during the conventional power-on downshift in the input torque limiting control from time $t_{A1}$ until the early period after the initiation of the inertia phase. On the other hand, as depicted in the time chart of the first electric motor torque $T_{M1}$, the first electric motor torque $T_{M1}$ is not changed by providing the input torque limiting control. Therefore, the throttle control of the engine 8 is provided as usual regardless of the provision of the input torque limiting control.

Since the AT input torque $T_{ATIN}$ is limited by providing the input torque limiting control relative to the torque variation (broken line) during the conventional power-on downshift from time $t_{A1}$ until the early period after the initiation of the inertia phase, the output torque $T_{OUT}$ corresponding to the drive force of the vehicle 6 is fixed to the torque at the time of the shifting output. Therefore, the provision of the input torque limiting control diminishes the torque difference between the output torque $T_{OUT}$ at the end of the inertia phase (time $t_{A3}$), which is the minimum value of the output torque $T_{OUT}$ during the downshift, and the maximum value of the output torque $T_{OUT}$ before the end of the inertial phase, i.e., a drive force draw-in amount corresponding to the torque difference, from TGP1 to TGP2 of FIG. 10. In other words, it can be seen from the time chart of the output torque $T_{OUT}$ that a first acceleration shock is alleviated in the two-stage acceleration shock that may occur during the power-on downshift so as not to be felt by a driver.

The input torque limiting control at the time of the quick depression of the accelerator pedal 46 will then be described with reference to FIG. 11. The points different from FIG. 10 will mainly be described with reference to FIG. 11.

As can be seen from the time chart of the accelerator opening degree Acc before time $t_{B1}$ of FIG. 11, this is the quick depression of the accelerator pedal 46 and, as a result, unlike FIG. 10, the input torque limit value $LT_{IN}$ greater than the AT input torque $T_{ATIN}$ at the time of the shifting output is set as the upper limit value $ULT_{ATIN}$ of the AT input torque $T_{ATIN}$ at SB3 of FIG. 9. Therefore, as indicated by the solid line in the time chart of the AT input torque $T_{ATIN}$ of FIG. 11, the input torque limiting control is provided to limit the AT input torque $T_{ATIN}$ from the time of the shifting output (time $t_{B1}$) to the initiation of the inertial phase (time $t_{B2}$) equal to or less than the input torque limit value $LT_{IN}$. In FIG. 11, as is the case with FIG. 10, the AT input torque $T_{ATIN}$ is limited solely by the output torque limitation of the second electric motor M2 in the input torque limiting control and the first electric motor torque $T_{M1}$ is not changed by providing the input torque limiting control.

Although the output torque $T_{OUT}$ is temporarily increased during the conventional power-on downshift around time $t_{B2}$ as indicated by the broken line in a portion S1 of FIG. 11, the AT input torque $T_{ATIN}$ is limited by providing the input torque limiting control relative to the torque change (broken line) during the conventional power-on downshift from time $t_{B1}$ until the early period after the initiation of the inertia phase and, therefore, the output torque $T_{OUT}$ is almost not changed by providing the input torque limiting control as indicated by the solid line in the portion S1, for example. It can be seen from the time chart of the output torque $T_{OUT}$ that the first acceleration shock is almost not generated in the two-stage acceleration shock that may occur during the power-on downshift and that the two-stage acceleration shock occurring in the absence of the input torque limiting control is consequently improved by providing the input torque limiting control to one-stage acceleration shock occurring only in a portion S2 of FIG. 11.

This embodiment has the following effects (A1) to (A10).
(A1) According to this embodiment, if the power-on downshift determining means 88 determines that a downshift of the automatic shifting portion 20 is executed during the accelerator depressing operation, the input torque limiting control means 94 provides the input torque limiting control to limit the AT input torque $T_{ATIN}$ before the initiation of the inertia phase in the downshift of the automatic shifting portion 20 as compared to the case of not executing the downshift and, therefore, the two-stage acceleration shock can be alleviated during the power-on downshift, which is the downshift during the accelerator depressing operation.

(A2) Since the engine torque $T_E$ making up a part of the AT input torque $T_{ATIN}$ has a certain amount of response delay to a throttle position change in the engine 8, if the accelerator variation $VR_{ACC}$ is smaller, the engine torque $T_E$ is increased in a manner sufficiently following the accelerator variation $VR_{ACC}$ while if the accelerator variation $VR_{ACC}$ is larger, the engine torque $T_E$ is increased with a delay relative to the accelerator variation $VR_{ACC}$. Therefore, although it is contemplated that the AT input torque $T_{ATIN}$ is increased to the extent that the initial response can be ensured to a level not causing deterioration at the time of the shifting output of the downshift if the accelerator variation $VR_{ACC}$ is smaller, it is contemplated that the AT input torque $T_{ATIN}$ is not increased to the extent that the initial response can be ensured at the time of the shifting output if the accelerator variation $VR_{ACC}$ is larger. In this regard, according to this embodiment, in the input torque limiting control, if the accelerator variation determining means 92 determines that the accelerator variation $VR_{ACC}$ is equal to or less than the accelerator variation limit $L1_{ACC}$, the input torque limiting control means 94 limits the AT input torque $T_{ATIN}$ before the initiation of the inertia phase in the downshift to the AT input torque $T_{ATIN}$ at the time of the shifting output commanding the execution of the downshift while if the accelerator variation determining means 92 determines that the accelerator variation $VR_{ACC}$ is greater than the accelerator variation limit $L1_{ACC}$, the input torque limiting control means 94 limits the AT input torque $T_{ATIN}$ before the initiation of the inertia phase in the downshift equal to or less than the input torque limit value $LT_{IN}$ greater than the AT input torque $T_{ATIN}$ at the time of the shifting output. Therefore, in consideration of the response delay of the AT input torque $T_{ATIN}$ relative to the accelerator variation $VR_{ACC}$, if the accelerator variation $VR_{ACC}$ is relatively larger and the rising of the AT input torque $T_{ATIN}$ is delayed (in the case of the quick depression of the accelerator pedal 46), the AT input torque $T_{ATIN}$ is limited when the AT input torque $T_{ATIN}$ is increased to some extent and, therefore, the deterioration of the initial response can be suppressed while the two-stage acceleration shock is alleviated during the power-on downshift. Therefore, the initial response is ensured not only at the time of the slow depression but also at the time of the quick depression of the accelerator pedal 46 and the improvement of the drivability may be achieved. Although it is contemplated that the two-stage acceleration shock can be alleviated by moderating the rate of change of the AT input torque $T_{ATIN}$ instead of limiting the level of the AT input torque $T_{ATIN}$, the input torque limiting control of this embodiment is advantageous in ensuring the initial response when the rate of change of the AT input torque $T_{ATIN}$ is moderated in such a way.

(A3) According to this embodiment, the accelerator variation $VR_{ACC}$ may correspond to the accelerator operation speed $SA_{CC}$ and the accelerator variation limit $L1_{ACC}$ may be the accelerator operation speed determination value $LS_{ACC}$ determined in advance for the accelerator operation speed $SA_{CC}$. As a result, the upper limit value $ULT_{ATIN}$ of the AT input torque $T_{ATIN}$ in the input torque limiting control can be determined based on the accelerator operation speed $SA_{CC}$.

(A4) According to this embodiment, the accelerator variation $VR_{ACC}$ may correspond to the accelerator operation amount (accelerator opening degree) Acc and the accelerator variation limit $L1_{ACC}$ may be the accelerator operation amount determination value $LQ_{ACC}$ determined in advance for the accelerator operation amount Acc. As a result, the upper limit value $ULT_{ATIN}$ of the AT input torque $T_{ATIN}$ in the input torque limiting control can be determined based on the accelerator operation amount Acc.

(A5) According to this embodiment, the input torque limiting control means 94 does not limit the engine torque $T_E$ to cause the engine torque $T_E$ to work as in the case that the input torque limiting control is not provided, and provides the input torque limiting control solely by the output torque limitation of the second electric motor M2. An electric motor is generally more responsive than the engine 8. Therefore, after the end of the input torque limiting control, the AT input torque $T_{ATIN}$ can be increased in a responsive manner depending on the accelerator variation $VR_{ACC}$ to ensure sufficient initial response.

(A6) According to this embodiment, the input torque limiting control means 94 provides the input torque limiting control by the output torque limitation of the first electric motor M1 or the second electric motor M2 associated with the electric power balance of the electric storage device 56 toward the discharging side during the charging power limitation and, in contrast, may provide the input torque limiting control by the output torque limitation of the first electric motor M1 or the second electric motor M2 associated with the electric power balance of the electric storage device 56 toward the charging side if not during the charging power limitation. As a result, even during the charging power limitation, the input torque limiting control may be provided to achieve the improvement of the drivability. If not during the charging power limitation, the charging of the electric storage device 56 is promoted and the improvement of the fuel economy may consequently be achieved. The lowering of the output torque $T_{OUT}$ in the inertia phase may be compensated by using the electric power charged and saved before the initiation of the inertia phase in the downshift of the automatic shifting portion 20 due to the input torque limiting control provided in the case other than the charging power limitation as described above, for example. As a result, the shock during downshift can be alleviated.

(A7) According to this embodiment, the power source 36 includes the engine 8, the first electric motor M1, the second electric motor M2, and the power distribution mechanism 16 having the different rotating elements RE1, RE2, and RE3 respectively coupled in a power transmittable manner to the engine 8, the first electric motor M1, and the transmitting member (input rotating member) 18; the second electric motor M2 is coupled in a power transmittable manner to the transmitting member 18; and the differential state of the power distribution mechanism 16 is controlled by controlling the operation state of the first electric motor M1. Therefore, since the gear ratio γ0 of the power distribution mechanism 16 can continuously be changed by the first electric motor M1 through the power transmission from the engine 8 to the transmitting member 18, the engine 8 can be driven such that the engine rotation speed $N_E$ is not restricted by the rotation speed $N_{18}$ of the transmitting member 18 so as to improve the fuel economy of the vehicle 6.

(A8) According to this embodiment, during both the discharging power limitation and the charging power limitation, the input torque limiting control means 94 provides the input torque limiting control by the output torque limitation of the first electric motor M1 and the second electric motor M2. In this case, preferably, the input torque limiting control is provided by the output torque limitation of the first electric motor M1 and the second electric motor M2 on the condition that one of the first electric motor M1 and the second electric motor M2 generates electric power while the other consumes electric power. Therefore, even during both the discharging power limitation and the charging power limitation, the improvement of the drivability may be achieved by providing the input torque limiting control while the electric power balance of the electric storage device 56 is brought closer to zero.

(A9) According to this embodiment, the input torque limiting control means 94 limits the AT input torque $T_{ATIN}$ before the initiation of the inertia phase in the downshift in the input torque limiting control, for example, as compared to the case of not executing the shift of the automatic shifting portion 20 and, therefore, the criteria of limiting the AT input torque $T_{ATIN}$ can be clarified.

(A10) According to this embodiment, the accelerator variation determining means 92 may determine that the accelerator variation $VR_{ACC}$ before the start of the downshift is equal to or less than the accelerator variation limit $L1_{ACC}$ if the output torque $T_{OUT}$ of the automatic shifting portion 20 at the time of the shifting output of the stepped shifting control means 82 commanding the execution of the downshift is equal to or greater than the output torque determination value $LT_{OUT}$ and, in contrast, may determine that the accelerator variation $VR_{ACC}$ before the start of the downshift is greater than the accelerator variation limit $L1_{ACC}$ if the output torque $T_{OUT}$ of the automatic shifting portion 20 at the time of the shifting output is less than the output torque determination value $LT_{OUT}$. As a result, the upper limit value $ULT_{ATIN}$ of the AT input torque $T_{ATIN}$ in the input torque limiting control can be determined based on the output torque $T_{OUT}$ of the automatic shifting portion 20 by calculating or detecting the output torque $T_{OUT}$ of the automatic shifting portion 20.

Although the embodiment of the present invention has been described in detail with reference to the drawings, this is merely one embodiment and the present invention can be implemented in variously modified or altered forms based on the knowledge of those skilled in the art.

For example, although the accelerator operation amount Acc and the accelerator operation speed $SA_{CC}$ are specifically mentioned as the accelerator variation $VR_{ACC}$ in this embodiment, accelerator variation $VR_{ACC}$ is not limited to one of them.

The units of the accelerator operation amount Acc and the accelerator operation speed $SA_{CC}$ are not particularly limited in this embodiment. The unit of the accelerator operation amount Acc is considered to be a rate to the maximum accelerator operation amount (%), an operation degree of the accelerator pedal 46 (degree), or a displacement amount of a predetermined portion of the accelerator pedal 46, for example. The unit of the accelerator operation speed $SA_{CC}$ is considered to be %/sec, degree/sec, or mm/sec, for example.

Although the case of providing the input torque limiting control during the engine running has been described in this embodiment, the input torque limiting control may be provided during the motor running. If the input torque limiting control is provided during the motor running, the output torque is limited in the second electric motor M2.

Although the electric motor subjected to the output torque limitation for providing the input torque limiting control is selected from the first electric motor M1 and the second electric motor M2 at SB4 of the flowchart of FIG. 9 in this embodiment, such a selection of the electric motor is not essential and, for example, the input torque limiting control may be provided solely by the output torque limitation of the second electric motor M2.

Although the drive device 7 includes the power distribution mechanism 16 as a differential mechanism and the first electric motor M1 in the embodiment, a so-called parallel hybrid vehicle may be available that has the engine 8, a clutch, the second electric motor M2, the automatic shifting portion 20, and the drive wheels 34 coupled in series without including the first electric motor M1 and the power distribution mechanism 16. Since the clutch is disposed as needed between the engine 8 and the second electric motor M2, the parallel hybrid vehicle may be configured without the clutch.

Although the vehicle 6 of this embodiment is a hybrid vehicle, the vehicle 6 may be a normal engine vehicle having the engine 8 coupled via a torque converter to the transmitting member 18 without the differential portion 11. In such a case, since an electric motor is not disposed, the input torque limiting control is provided by the output torque limitation of the engine 8.

Although the power-on downshift determining means 88 determines that the power-on downshift is executed if the shifting determination is made to indicate that a downshift of the automatic shifting portion 20 should be executed in the embodiment, whether the power-on downshift is executed may not be determined at the time of the shifting determination and, for example, whether the power-on downshift is executed may be determined before the shifting determination by predicting that the shifting determination of the downshift is made, from the vehicle state indicated by the accelerator opening degree Acc and the vehicle speed V.

Although the input torque limiting control may be provided during a downshift between any gear stages of the automatic shifting portion 20 in the embodiment, the input torque limiting control may, in contrast, be provided only during a downshift between certain gear stages of the automatic shifting portion 20.

Although the second electric motor M2 is directly coupled to the transmitting member 18 in the embodiment, the coupling position of the second electric motor M2 is not limited thereto and the second electric motor M2 may be coupled directly or indirectly via a transmission, a planetary gear device, an engagement device, etc., to the power transmission path from the engine 8 or the transmitting member 18 to the drive wheels 34. For example, the second electric motor M2 may be coupled in a power transmittable manner to the output shaft 22 rather than the transmitting member 18.

Although the differential portion 11 functions as an electric stepless transmission with a gear ratio γ0 continuously varied from a minimum value γ0min to a maximum value γ0max by controlling the operation state of the first electric motor M1 in the embodiment, the differential portion 11 may have the gear ratio γ0 varied not continuously in a stepped manner on purpose by utilizing the differential action, for example.

Although the power distribution mechanism 16 of the embodiment has the different portion carrier CA0 coupled to the engine 8, the different portion sun gear S0 coupled to the first electric motor M1, and the different portion ring gear R0 coupled to the transmitting member 18, these coupling relationships are not necessarily limited thereto, and the engine 8, the first electric motor M1, and the transmitting member 18 may be coupled to any of the three elements CA0, S0, and R0 of the differential potion planetary gear device 24.

Although the engine 8 is directly coupled to the input shaft 14 in the embodiment, the engine 8 may be coupled operatively via a gear or a belt, for example, and may not be disposed on the common shaft center.

Although the first electric motor M1 and the second electric motor M2 are concentrically disposed on the input shaft 14 in the embodiment with the first electric motor M1 coupled to the different portion sun gear S0 and the second electric motor M2 coupled to the transmitting member 18, the electric motors may not necessarily be disposed in this way and, for example, the first electric motor M1 may be coupled to the different portion sun gear S0 and the second electric motor M2 may be coupled to the transmitting member 18 operatively via a gear, a belt, a reduction device, etc.

In the embodiment, the hydraulic friction engagement devices such as the first clutch C1 and the second clutch C2 may be made up of magnetic, electromagnetic, and mechanical engagement devices such as powder (magnetic particle) clutches, electromagnetic clutches, and meshing type dog clutches. For example, in the case of the electromagnetic clutches, the hydraulic control circuit 70 is made up of a switching device, an electromagnetic switching device, etc., that switch an electric command signal circuit to the electromagnetic clutches, instead of a valve device that switches oil passages.

Although the automatic shifting portion 20 is serially coupled to the differential portion 11 via the transmitting member 18 in the embodiment, a counter shaft may be disposed in parallel with the input shaft 14 and the automatic shifting portion 20 may concentrically be disposed on the counter shaft. In this case, the differential portion 11 and the automatic shifting portion 20 are coupled in a power transmittable manner via a set of transmitting members made up of a counter gear pair, a sprocket, and a chain acting as the transmitting member 18, for example.

Although the engine 8 is directly coupled to the differential portion 11 in the embodiment, the direct coupling may not necessarily be achieved and the engine 8 may be coupled via a clutch to the differential portion 11.

Although the embodiment is configured such that the differential portion 11 and the automatic shifting portion 20 are serially connected, the configuration is not particularly limited thereto and, for example, the power transmission device 10 as a whole may include the electric differential function that may electrically change the differential state as well as a function of shifting based on the principle different from that of the shifting by the electric differential function, and the differential portion 11 and the automatic shifting portion 20 may not mechanically be independent. The disposition positions and the disposition orders thereof may not particularly be limited. In short, the automatic shifting portion 20 may be disposed so as to make up a part of the power transmission path from the engine 8 to the drive wheels 34.

Although the power distribution mechanism 16 is made up of one planetary gear device (the differential potion planetary gear device 24) in the embodiment, the power distribution mechanism 16 may be made up of two or more planetary gear devices. The differential potion planetary gear device 24 is not limited to the single pinion type and may be a double pinion type planetary gear device. Even when the power distribution mechanism 16 is made up of two or more planetary gear devices, the rotating elements of the planetary gear devices are coupled in a power transmittable manner to the engine 8, the first and second electric motors M1, M2, the transmitting member 18, and the output shaft 22 in some configurations such that the stepped shifting and the stepless shifting are switched by controlling the clutches C and the brakes B connected to the rotating elements of the planetary gear devices.

Although the first electric motor M1 is directly coupled to the second rotating element RE2 and the second electric motor M2 is directly coupled to the third rotating element RE3 in the power transmission device 10 of the embodiment, the first electric motor M1 may be coupled via an engagement element such as a clutch to the second rotating element RE2 and the second electric motor M2 may be coupled via an engagement element such as a clutch to the third rotating element RE3.

Although the second electric motor M2 is coupled to the transmitting member 18 making up a part of the power transmission path from the engine 8 to the drive wheels 34 in the embodiment, the power transmission device 10 may be configured such that the second electric motor M2 is allowed to couple via an engagement element such as a clutch to the power distribution mechanism 16 in addition to being coupled to the power transmission path so as to control the differential state of the power distribution mechanism 16 through the second electric motor M2 instead of the first electric motor M1.

Although the differential portion 11 includes the first electric motor M1 and the second electric motor M2 in the embodiment, the first electric motor M1 and the second electric motor M2 may be included in the power transmission device 10 separately from the differential portion 11.

Although not exemplary illustrated one by one, the present invention is implemented with various modifications applied without departing from the spirit thereof.

NOMENCLATURE OF ELEMENTS

6: vehicle
7: vehicle drive device
8: engine
16: power distribution mechanism (differential mechanism)
18: transmitting member (input rotating member)
20: automatic shifting portion
34: drive wheels
36: power source
56: electric storage device
80: electronic control device (controller)
M1: first electric motor (one or two or more electric motors)
M2: second electric motor (one or two or more electric motors)
RE1: first rotating element (first element)
RE2: second rotating element (second element)
RE3: third rotating element (third element)

The invention claimed is:

1. A control device, for a vehicle drive device in a vehicle, the vehicle having a power source including an engine, and the vehicle having a stepped automatic shifting portion making up a part of a power transmission path between the power source and a drive wheel of the vehicle, the control device providing input torque limiting control, if a downshift of the automatic shifting portion is executed during an accelerator depressing operation, to limit an input torque of the automatic shifting portion before initiation of an inertia phase in the downshift, as compared to a case of not executing the downshift, wherein
in the input torque limiting control, if an accelerator variation before a start of the downshift is equal to or less than a predetermined accelerator variation limit, the control device limits the input torque before the initiation of the inertia phase to an input torque at a time of a shifting output commanding the execution of the downshift, and wherein if the accelerator variation before the start of the downshift is greater than the accelerator variation limit, the control device limits the input torque before the initiation of the inertia phase to equal to or less than a predetermined input torque limit value larger than the input torque at the time of the shifting output.

2. The control device for a vehicle drive device of claim 1, wherein
the accelerator variation corresponds to an accelerator operation speed, and wherein
the accelerator variation limit includes a predetermined accelerator operation speed determination value for the accelerator operation speed.

3. The control device for a vehicle drive device of claim 2, wherein
the accelerator variation further corresponds to an accelerator operation amount, and wherein
the accelerator variation limit further includes a predetermined accelerator operation amount determination value for the accelerator operation amount.

4. The control device for a vehicle drive device of claim 3, wherein
the power source is made up of the engine, capable of transmitting power to an input rotating member of the automatic shifting portion, and at least one electric motor, and wherein
if the downshift of the automatic shifting portion is executed during the accelerator depressing operation, the input torque limiting control is provided by output torque limitation of the at least one electric motor.

5. The control device for a vehicle drive device of claim 4, wherein
the power source includes a first electric motor and a second electric motor included in the at least one electric motor, wherein
the control device is disposed with an electric storage device capable of giving/receiving electric power to/from each of the first electric motor and the second electric motor, wherein
during a charging power limitation while a charging power to the electric storage device is limited to lower than a predetermined allowable charging power, the input torque limiting control is provided by an output torque limitation, of the first electric motor or the second electric motor, that has an electric power balance of the electric storage device toward a discharging side, and wherein if not during the charging power limitation, the input torque limiting control is provided by the output torque limitation, of the first electric motor or the second electric motor, that is associated with the electric power balance of the electric storage device toward a charging side.

6. The control device for a vehicle drive device of claim 5, wherein
the power source includes a differential mechanism having different rotating elements respectively coupled in a power transmittable manner to the engine, the first electric motor, and the input rotating member, wherein
the second electric motor is coupled in a power transmittable manner to the input rotating member, and wherein
a differential state of the differential mechanism is controlled by controlling an operation state of the first electric motor.

7. The control device for a vehicle drive device of claim 2, wherein
the power source is made up of the engine, capable of transmitting power to an input rotating member of the automatic shifting portion, and at least one electric motor, and wherein
if the downshift of the automatic shifting portion is executed during the accelerator depressing operation, the input torque limiting control is provided by output torque limitation of the at least one electric motor.

8. The control device for a vehicle drive device of claim 7, wherein the power source includes a first electric motor and a second electric motor included in the at least one electric motor, wherein the control device is disposed with an electric storage device capable of giving/receiving electric power to/from each of the first electric motor and the second electric motor, wherein during a charging power limitation while a charging power to the electric storage device is limited to lower than a predetermined allowable charging power, the input torque limiting control is provided by an output torque limitation, of the first electric motor or the second electric motor, that has an electric power balance of the electric storage device toward a discharging side, and wherein if not during the charging power limitation, the input torque limiting control is provided by the output torque limitation, of the first electric motor or the second electric motor, that is associated with the electric power balance of the electric storage device toward a charging side.

9. The control device for a vehicle drive device of claim 8, wherein the power source includes a differential mechanism having different rotating elements respectively coupled in a power transmittable manner to the engine, the first electric motor, and the input rotating member, wherein the second electric motor is coupled in a power transmittable manner to the input rotating member, and wherein a differential state of the differential mechanism is controlled by controlling an operation state of the first electric motor.

10. The control device for a vehicle drive device of claim 1, wherein the accelerator variation corresponds to an accelerator operation amount, and wherein the accelerator variation limit is a predetermined accelerator operation amount determination value for the accelerator operation amount.

11. The control device for a vehicle drive device of claim 10, wherein the power source is made up of the engine, capable of transmitting power to an input rotating member of the automatic shifting portion, and at least one electric motor, and wherein if the downshift of the automatic shifting portion is executed during the accelerator depressing operation, the input torque limiting control is provided by output torque limitation of the at least one electric motor.

12. The control device for a vehicle drive device of claim 11, wherein the power source includes a first electric motor and a second electric motor included in the at least one electric motor, wherein the control device is disposed with an electric storage device capable of giving/receiving electric power to/from each of the first electric motor and the second electric motor, wherein during a charging power limitation while a charging power to the electric storage device is limited to lower than a predetermined allowable charging power, the input torque limiting control is provided by an output torque limitation, of the first electric motor or the second electric motor, that has an electric power balance of the electric storage device toward a discharging side, and wherein if not during the charging power limitation, the input torque limiting control is provided by the output torque limitation, of the first electric motor or the second electric motor, that is associated with the electric power balance of the electric storage device toward a charging side.

13. The control device for a vehicle drive device of claim 12, wherein the power source includes a differential mechanism having different rotating elements respectively coupled in a power transmittable manner to the engine, the first electric motor, and the input rotating member, wherein the second electric motor is coupled in a power transmittable manner to the input rotating member, and wherein a differential state of the differential mechanism is controlled by controlling an operation state of the first electric motor.

14. The control device for a vehicle drive device of claim 1, wherein the power source is made up of the engine, capable of transmitting power to an input rotating member of the automatic shifting portion, and at least one electric motor, and wherein if the downshift of the automatic shifting portion is executed during the accelerator depressing operation, the input torque limiting control is provided by output torque limitation of the at least one electric motor.

15. The control device for a vehicle drive device of claim 14, wherein the power source includes a first electric motor and a second electric motor included in the at least one electric motor, wherein the control device is disposed with an electric storage device capable of giving/receiving electric power to/from each of the first electric motor and the second electric motor, wherein during a charging power limitation while a charging power to the electric storage device is limited to lower than a predetermined allowable charging power, the input torque limiting control is provided by an output torque limitation, of the first electric motor or the second electric motor, that has an electric power balance of the electric storage device toward a discharging side, and wherein if not during the charging power limitation, the input torque limiting control is provided by the output torque limitation, of the first electric motor or the second electric motor, that is associated with the electric power balance of the electric storage device toward a charging side.

16. The control device for a vehicle drive device of claim 15, wherein the power source includes a differential mechanism having different rotating elements respectively coupled in a power transmittable manner to the engine, the first electric motor, and the input rotating member, wherein the second electric motor is coupled in a power transmittable manner to the input rotating member, and wherein a differential state of the differential mechanism is controlled by controlling an operation state of the first electric motor.

17. The control device for a vehicle drive device of claim 16, wherein during a discharging power limitation while a discharging power of the electric storage device is limited to lower than a predetermined allowable discharging power as well as the charging power limitation, the input torque limiting control is provided by an output torque limitation of the first electric motor and the second electric motor on the condition that one of the first electric motor and the second electric motor generates electric power while the other consumes electric power.

18. The control device for a vehicle drive device of claim 1, wherein if an output torque of the automatic shifting portion at the time of the shifting output is equal to or greater than a predetermined output torque determination value, the control device determines that the accelerator variation before the start of the downshift is equal to or less than the accelerator variation limit, and wherein if the output torque of the automatic shifting portion at the time of the shifting output is less than the output torque determination value, the control device determines that the accelerator variation before the start of the downshift is greater than the accelerator variation limit.

* * * * *